United States Patent
Bentley et al.

(10) Patent No.: US 10,353,916 B2
(45) Date of Patent: Jul. 16, 2019

(54) TECHNIQUES FOR CONVERSION OF CAD DESCRIPTIONS

(71) Applicant: Bentley Systems, Incorporated, Exton, PA (US)

(72) Inventors: Keith A. Bentley, Elverson, PA (US); Samuel W. Wilson, Downington, PA (US)

(73) Assignee: Bentley Systems, Incorporated, Exton, PA (US)

( * ) Notice: Subject to any disclaimer, the term of this patent is extended or adjusted under 35 U.S.C. 154(b) by 611 days.

(21) Appl. No.: 15/080,858

(22) Filed: Mar. 25, 2016

(65) Prior Publication Data
US 2017/0277761 A1    Sep. 28, 2017

(51) Int. Cl.
*G06F 17/30*    (2006.01)
*G06F 16/25*    (2019.01)
(Continued)

(52) U.S. Cl.
CPC .......... *G06F 16/258* (2019.01); *G06F 16/288* (2019.01); *G06F 17/50* (2013.01);
(Continued)

(58) Field of Classification Search
CPC ......... G06F 17/30569; G06F 17/30604; G06F 16/258; G06F 16/288
(Continued)

(56) References Cited

U.S. PATENT DOCUMENTS 4,878,179 A * 10/1989 Larsen ................. G01R 31/302
                                                         716/136
5,265,197 A * 11/1993 Kondo .................... G06T 17/00
                                                         345/420
(Continued)

FOREIGN PATENT DOCUMENTS

| EP | 1580696 A2 | 9/2005 |
| EP | 2940611 A1 | 11/2015 |
| EP | 2990970 A1 | 3/2016 |

OTHER PUBLICATIONS

"Notification of Transmittal of the International Search Report and the Written Opinion of the International Searching Authority, or the Declaration," International Filing Date: Nov. 3, 2016, International Application No. PCT/US2016/060301, Applicant: Bentley Systems, Incorporated, Inc., dated Feb. 27, 2017, pp. 1-19.
(Continued)

*Primary Examiner* — Mark E Hershley
(74) *Attorney, Agent, or Firm* — Cesari and McKenna, LLP; James A. Blanchette

(57) ABSTRACT

In one embodiment, techniques are provided for converting a CAD description maintained in a first storage format (e.g., a file-based storage format) of a source repository to a second storage format (e.g., a relational database-based storage format) of an output repository. The techniques may generate a single, coherent representation from spatially ambiguous "fragments" by generating an acyclic model graph for each graphical view, and then storing models of the acyclic model graph in the second storage format (e.g.,
(Continued)

the relational database-based storage format). The techniques may further produce a post-conversion CAD description that preserves human-readable names and information relationships related to levels by examining attachment specific copies of level structures (i.e. levels and attached levels) referenced from attachments, and generating from these categories and subcategories in the second storage format (e.g., the relational database-based storage format).

33 Claims, 17 Drawing Sheets

(51) Int. Cl.
    *G06F 16/28*     (2019.01)
    *G06F 17/50*     (2006.01)
    *G06T 17/00*     (2006.01)

(52) U.S. Cl.
    CPC .......... *G06T 17/00* (2013.01); *G06F 2217/02* (2013.01); *G06T 2210/32* (2013.01); *G06T 2210/61* (2013.01)

(58) Field of Classification Search
    USPC ........................................................ 707/756
    See application file for complete search history.

(56) References Cited

U.S. PATENT DOCUMENTS

| | | | | |
|---|---|---|---|---|
| 6,266,053 B1* | 7/2001 | French | .................. | G06T 17/005 |
| | | | | 345/440 |
| 6,634,008 B1* | 10/2003 | Dole | .................. | G06F 17/5045 |
| | | | | 707/999.01 |
| 6,671,701 B1* | 12/2003 | Chouinard | ............ | G06F 16/258 |
| 7,107,280 B2 | 9/2006 | Tomic et al. | | |
| 7,194,489 B2 | 3/2007 | Bentley et al. | | |
| 7,273,367 B2* | 9/2007 | Hughes | .................... | A61C 7/00 |
| | | | | 433/24 |
| 7,432,925 B2* | 10/2008 | D'Amora | ................ | G06T 17/00 |
| | | | | 345/419 |
| 7,739,316 B2* | 6/2010 | Thompson | ............ | G06F 16/284 |
| | | | | 707/825 |
| 7,810,025 B2 | 10/2010 | Blair et al. | | |
| 8,041,735 B1* | 10/2011 | Lacapra | .................. | G06F 16/13 |
| | | | | 707/783 |
| 8,131,739 B2* | 3/2012 | Wu | .......................... | G06F 16/10 |
| | | | | 707/758 |
| 8,155,943 B2 | 4/2012 | Nasle | | |
| 8,190,648 B1 | 5/2012 | Tomic et al. | | |
| 8,238,696 B2* | 8/2012 | Dart | ......................... | G06F 16/50 |
| | | | | 382/305 |
| 8,909,579 B2* | 12/2014 | Ivrii | ..................... | G06F 17/5081 |
| | | | | 706/46 |
| 2002/0032697 A1* | 3/2002 | French | .................. | G06T 17/005 |
| | | | | 715/211 |
| 2004/0153824 A1* | 8/2004 | Devarajan | ............... | G06T 17/00 |
| | | | | 714/38.1 |
| 2007/0198971 A1* | 8/2007 | Dasu | ......................... | G06F 8/433 |
| | | | | 717/140 |
| 2008/0243305 A1* | 10/2008 | Lee | .......................... | B25J 9/1602 |
| | | | | 700/246 |
| 2011/0050691 A1* | 3/2011 | Hamedi | ................. | G06T 17/205 |
| | | | | 345/420 |
| 2012/0004891 A1* | 1/2012 | Rameau | .................. | G06F 17/50 |
| | | | | 703/6 |
| 2012/0019535 A1* | 1/2012 | Miyashita | ............. | G06T 11/206 |
| | | | | 345/440 |
| 2012/0311514 A1* | 12/2012 | Lavin | ..................... | G06F 17/504 |
| | | | | 716/108 |
| 2014/0362930 A1* | 12/2014 | Brockmann | ......... | H04N 19/103 |
| | | | | 375/240.26 |
| 2014/0378022 A1* | 12/2014 | Muthyala | ............... | A63H 33/06 |
| | | | | 446/91 |
| 2015/0356207 A1* | 12/2015 | Reitman | ............. | G06F 17/5095 |
| | | | | 703/1 |
| 2016/0019314 A1* | 1/2016 | Bowman | ................. | G06F 17/50 |
| | | | | 707/798 |
| 2016/0239751 A1* | 8/2016 | Mosterman | ............ | G06N 7/005 |
| 2016/0246899 A1* | 8/2016 | Hirschtick | .............. | G06F 17/50 |

OTHER PUBLICATIONS

"AutoCad MAP 3D 2011—Tutorial:Creating a Map Book with and Inset," Chapter 6, Autodesk, Inc., Apr. 2010, pp. 217-242.

U.S. Appl. No. 14/928,614, filed Oct. 30, 2015 by Keith A. Bentley for a Techniques for Application Undo and Redo Using SQL Patchsets or Changesets, pp. 1-40.

\* cited by examiner

TECHNIQUES FOR CONVERSION OF CAD DESCRIPTIONS

BACKGROUND

Technical Field

The present disclosure relates generally to computer aided design (CAD), and more specifically to techniques for converting CAD descriptions.

Background Information

Many computer aided design (CAD) applications store CAD descriptions of physical structures (e.g., buildings, civil infrastructure projects, etc.) using a specific storage format. One type of storage format (referred to herein as a "file-based storage format") involves one or more files (e.g., a root file and one or more attached files) that maintain a series of data structures that represent elements organized into models, associated with levels that help define graphical views.

Elements generally describe individual units of the structure. For example, in a simple CAD description of a building, elements may represent walls, doors, windows, furniture, etc. Models generally group together related elements into larger units, effectively "owning" a set of elements. A CAD description consists of at least one model (e.g., a root model), and often a number of additional models (e.g., attached models) organized under the root model using attachments to form a model graph. For example, in a simple CAD description of a building, a root model may represent an overall building, and may reference, via attachments, attached models that represent individual floors, each attached model owning elements representing walls, doors, windows, furniture, etc. disposed on a respective floor. A level generally describes selected elements that should be displayed (e.g., "turned on") and, in some cases, symbology (e.g., color, line weight, line style etc.) that controls their visual appearance. For example, in a simple CAD description of a building, a level may include all the elements that represent windows, and indicate that such elements should be displayed with black, thin, dashed lines. Graphical views generally are representations of selected elements shown with certain symbology. For example, in a simple example CAD description of a building, a particular graphical view may show elements that represent walls and windows, with walls represented with black, bold, solid lines and windows represented in black, thin, dashed lines. Graphical views may be defined by attachment paths from a root model in the model graph, with the symbology and range of elements indicated by elements of the model graph, the levels to which the elements belong, and by attachment specific copies of levels ("attached levels") that override the display status and symbology of the levels. Such an arrangement may be better understood by reference to the example in FIG. 1

FIG. 1 is a data structure diagram 100 of a portion of an example first storage format (e.g., a file-based storage format) for a CAD description. The data structure diagram 100 may be consistent with the DgnV8 format, compatible with CAD applications available from Bentley Systems, Inc. of Exton, Pa. However, it should be understood that similar formats may be used in other CAD applications, available from other vendors. The data structure diagram 100 represents a number of data items, embodied using various data structures. In the data structure diagram 100, a file data structure 110 serves as a header of each file (e.g., a root file or attached file), and includes a name field that indicates a unique human readable name for the file, a models field that references model data structures contained in the file, and a levels field that references level data structures contained in the file. Each model data structure 120 represents an individual model (e.g., a root model or an attached model) and includes a model ID field that indicates a unique identifier for the model, a name field that indicates a unique human readable name for the model, a file field that references the owning file, and elements fields that reference element data structures owned by the model. Each model may be located in a spatial coordinate system used to define the arrangement of its elements. Each element data structure 130 represents an individual element owned by a model and includes an element ID field that indicates a unique identifier for the element within the file, a model ID field that indicates the owning model data structure, a level field that indicates a level associated with the element, a data field that includes information describing the unit of the physical structure being represented by the element, and a DHDR field that indicates an associated DHDR data structure. Each DHDR data structure 140 indicates range and symbology information that describes how the owning element should be rendered, including a color field, a weight field and a style field. Each element data structure may reference a level data structure 150 for a level to which it belongs. Each level data structure 150 represents a level to which elements may belong, including a level ID field that indicates a unique identifier for the level, a name field that indicates a unique human-readable name for the level, a display field that indicates whether elements on the level should be displayed (e.g., "turned on"), and symbology fields, such as a color field, a weight field and a style field, that indicate overrides to the symbology of individual elements of the level.

A model graph is defined using attachment data structures that defines the ownership structure of models and the presence of any attached levels. Each attachment data structure 160 includes a file name field that references the file containing the attached model, a model name field that references the attached model, a transform field that indicates any spatial transform that may be applied to relate a spatial coordinate systems used by the attached model to that of the owning model, and attached level fields that references attached levels that may be used with the attachment. Each attached level data structure 170 defines overrides for an underlying level, and includes a level ID field that identifies the attached level, a display field that indicates whether the level should be displayed, and symbology fields, such as a color field, a weight field and a style field, that may override the symbology of the level. A graphical view may be defined in the model graph by a view data structure 190 that references a particular model data structure 120 that serves as a root for attachment paths of the model graph of the view.

In some cases, it may be necessary to convert a CAD description using the first storage format (e.g., the file-based storage format) depicted in FIG. 1 to a second storage format. Such conversion may be needed to enable interoperability between different CAD applications, or different versions of the same CAD application that may utilize different storage formats, among other purposes. However, certain challenges have been encountered in designing such a converter.

A first challenge involves dealing with spatial ambiguities. As mentioned above, models in the file-based storage format may each use their own spatial coordinate system (i.e. there may be no predetermined spatial relationship with other models, and instead relationships may be defined using transforms of attachments). As such, the CAD description may be thought of as a collection of individual "fragments." Further, models in the first storage format may attach to any other model. In effect, the "fragments" can be connected in a myriad of different ways conveying different meanings. Given such a structure, it may be difficult to derive a single, cohesive representation from the connected "fragments".

One specific source of difficulties may be scenarios where there are multiple root models and cycles within the model graph. For example, a first root model may be used to represent the design in physical space, using a first set of transforms to relate a set of attached models. A second root model may be used to represent a graphical view having a certain composition and use a second set of transform (e.g., selected for presentation purposes) to relate those same set of attached models. Thereby multiple root models may exist. Further, a first model (e.g., a first attached model) may attach to a second model (e.g., a second attached model), and the second model may also attach, directly or via recursion, to the first model. Thereby cycles may exist.

Another specific source of difficulties may be scenarios where there are multiple attachment paths to the same attached model from a single root model, but using different transforms, causing there to be multiple instantiations of elements. For example, a root model may attach to an attached model using a first transform along one path of the model graph and attach to the same attached model using a second, different transform along another path of the model graph, thereby duplicating the attached models elements, but in different locations.

A second challenge involves accurately preserving human-readable names and information relationships related to the per-file levels in the pre-conversion CAD description into a post-conversion CAD description that has only one set of levels. For example, while a converter may preserve the visual appearance of a graphical view, human-readable names and information relationships associated with attached levels from the model graph may be lost. A user looking to the post-conversion CAD description may not see the human-readable names and information relationships they are familiar with, and therefor may have difficulty interpreting or manipulating the design.

Accordingly, there is a need for improved techniques for converting a CAD description maintained in a first storage format (e.g., a file-based storage format) to a second storage format that may address challenges introduced by spatial ambiguities in the model graph of the first storage format and/or may accurately preserve human-readable names and information relationships where the second storage format does not use the same structures.

SUMMARY

Techniques are provided for converting a CAD description maintained in a first storage format (e.g., a file-based storage format) of a source repository to a second storage format (e.g., a relational database-based storage format) of an output repository. The techniques may generate a single coherent representation from spatially ambiguous "fragments" by generating an acyclic model graph for each graphical view, and then storing models of the acyclic model graph in the second storage format (e.g., the relational database-based storage format). The acyclic model graph may be built by starting from a designated root model of an initial model graph, traversing attachment paths, mapping each model encountered into a model of the acyclic model graph that uses the single project coordinate system, and duplicating models and breaking cycles as needed. The techniques may further produce a post-conversion CAD description that preserve human-readable names and information relationships related to levels by examining attachment specific copies of level structures (i.e. levels and attached levels) referenced from attachments, and generating from these categories and subcategories in the second storage format (e.g., the relational database-based storage format). Namely, for each level associated with an attachment, generating a category and a default subcategory corresponding to the respective level, and for each attached level, generating a subcategory referenced by the category corresponding to the level.

In one specific example embodiment, a converter generates a single, coherent representation from spatially ambiguous "fragments" by defining a single project coordinate system, and then accessing from a source repository the initial model graph in the first storage format (e.g., a file-based storage format), and building an acyclic model graph for each graphical view that uses the single project coordinate system from the initial model graph. Building the acyclic model graph includes designating a root model from one or more root models present in the initial model graph, and then, beginning from the designated root model, searching attachment paths in the initial model graph, and mapping each model encountered into a model of the acyclic model graph that uses the single project coordinate system by applying each spatial transform along the attachment path to the encountered model. When a same model is encountered multiple times as a result of multiple attachment paths in the initial model graph, the converter creates a new model in the acyclic model graph for each unique spatial transform. When a same model is encountered multiple times as a result of a cycle along an attachment path with the same transform, the converter stops searching along that attachment path. The converter generates the coherent representation by storing the models of the acyclic model graph to an output repository in the second storage format (e.g., the relational database-based storage format), where they may thereafter be utilized by a CAD application.

In another specific example embodiment, the converter preserves human-readable names and information relationships by generating categories and subcategories. While constructing the acyclic model graph, for each referenced level, the converter generates a category and a default subcategory of the second storage format corresponding to the respective level, where the default subcategory maintains the display status and symbology defined by the respective level. For each referenced attached level, the converter generates a subcategory referenced by the category corresponding to the level. The subcategory maintains the display status and symbology that overrides display status and symbology of the default subcategory as defined by the respective attached level.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
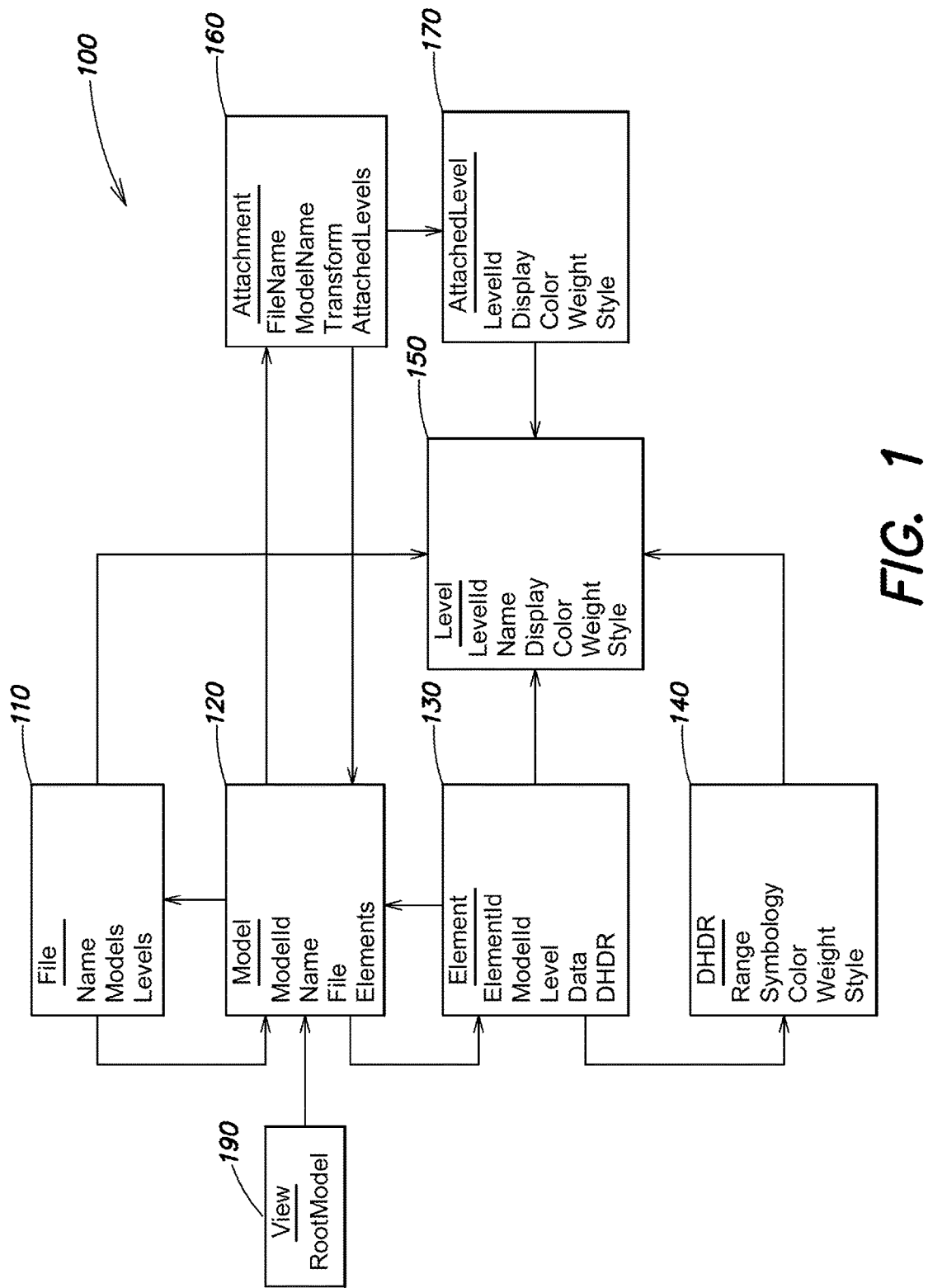
FIG. 1 is a data structure diagram of a portion of an example first storage format (e.g., a file-based storage format) for a CAD description.
Figure 2:
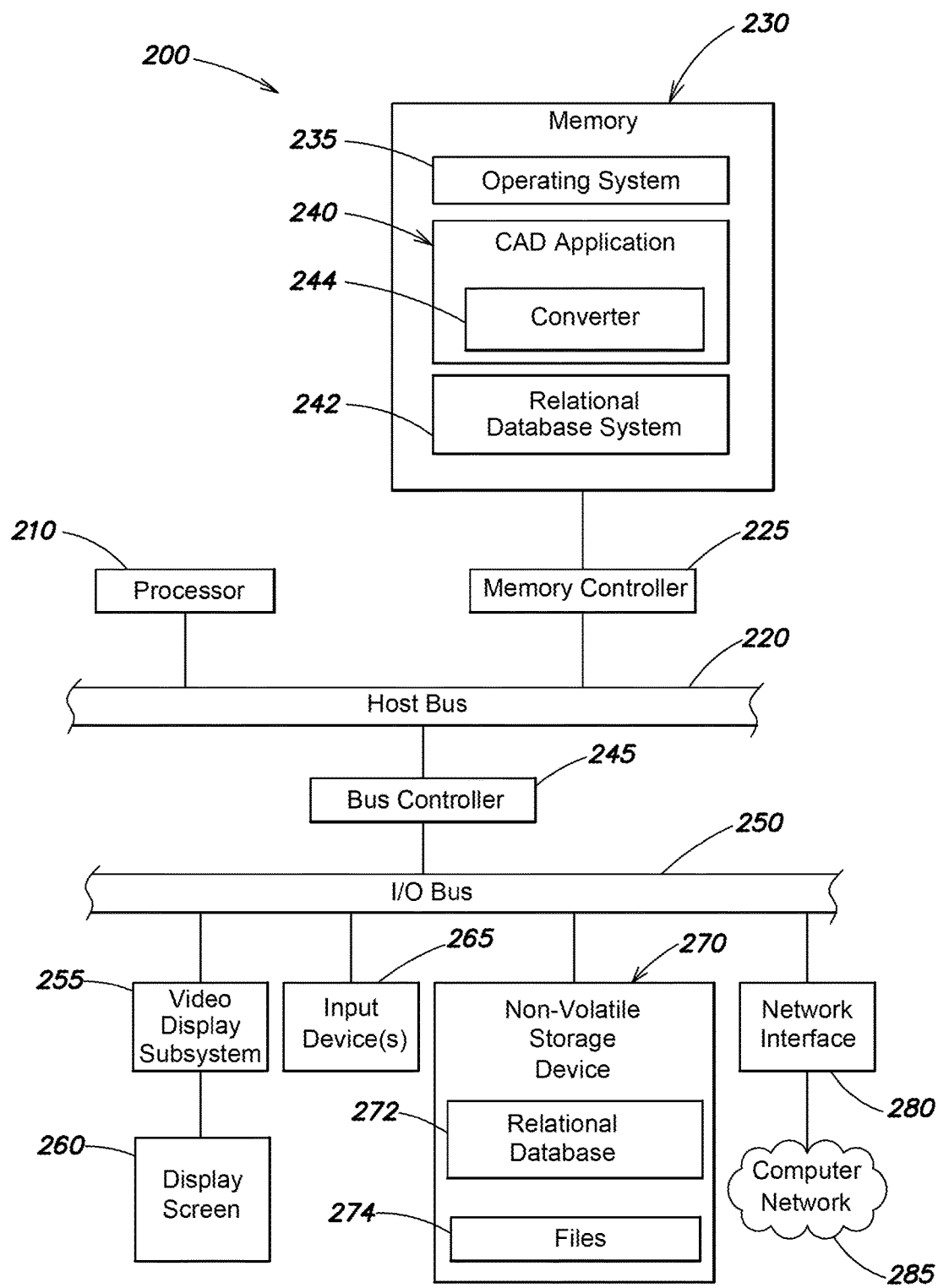
FIG. 2 is a block diagram of an example electronic device in which at least some of the presently described techniques may be employed.

FIG. 2 is a block diagram of an example electronic device 200 in which at least some of the presently described techniques may be employed. The electronic device may be designed for stationary operation (e.g., may be a desktop computer), or may be a portable electronic device (e.g., a notebook computer, a tablet computer, etc.) designed to be readily transported by a user and utilized from a variety of different locations. The electronic device 200 includes at least one processor 210 coupled to a host bus 220. A volatile memory 230, such as a random access memory (RAM), is coupled to the host bus 220 via a memory controller 225 and configured to store an in-memory copy of software and data. The in-memory copy of software may include executable instructions for an operating system 235, a CAD application 240, a relational database system 242 and a CAD description converter 244, among other software. Such software is loaded into the volatile memory 230 when needed from persistent copies of the software (not shown) maintained on a non-volatile storage device 270 (e.g., a hard disk, a solid-state drive, etc.) The in-memory copy of data may include an in-memory copy of CAD descriptions used by the CAD application 240.

The host bus 220 of the electronic device 200 is coupled to an input/output (I/O) bus 250 through a bus controller 245. A video display subsystem 255 that includes a display screen 260 is coupled to the I/O bus 250. The display screen 260 may show a user interface of the CAD application 240 and/or the converter 244, as well as user interfaces of other software executed on the electronic device 200. One or more input devices 265 (e.g., a mouse, keyboard, touch sensor, etc.) are also coupled to the I/O bus 250. The input devices 265, among other uses, are used to interact with the CAD application 240 and/or the converter 244. The above-discussed non-volatile storage device 270, and a network interface 280, are further coupled to the I/O bus 250.

The network interface 280 may be coupled to a computer network 285 (e.g., the Internet) to allow for communication between the electronic device 200 and other electronic devices, using any of a number of well-known networking protocols, thereby enabling various distributed, collaborative or remote computing configurations. It should be understood that, according to such configurations, some, or all, of the software and data shown resident in memory 230 or stored in the non-volatile storage device 270 may be remotely located on another electronic device, and accessed via the computer network 285.

The non-volatile storage device 270, in addition to storing copies of the executable software, persistently stores copies of CAD descriptions used by the CAD application 240. Certain CAD descriptions may be stored in files 274 according to a first storage format (e.g., a file-based storage format). Other CAD descriptions may be stored in tables of a relational database 272 according to a second storage format (e.g., relational database-based storage format). The files of the second storage format (e.g., relational database-based storage format) may be directly loaded by the relational database system 242 into memory 230 and used by the CAD application 240, while the files 274 of the first storage format (e.g., the file-based storage format) may require conversion by the converter 244 before being directly usable by the CAD application 240 (but may be directly useable by other CAD applications (not shown) that natively utilize that storage format). From the perspective of the converter 244, the files 274 of the first storage format (e.g., the file-based storage format) may be considered part a "source repository", and the relational database 272 may be considered part of an "output repository".

In various implementations, the application 240, relational database system 242, converter 244, the files 274 of the source repository, and relational database 272 of the output repository, may take on various forms. In some specific implementations, the CAD application 240 is the i-Model Composition Server or the ProjectWise Conversion Server available from Bentley Systems, Inc. of Exton, Pa., the relational database system 242 is a SQL database system (e.g., the SQLite® database system available open source), the converter 244 is an embedded process of the CAD application 240, the files 274 may DgnV8 files that utilize a DgnV8 storage format, and the relational database 272 may be a DgnDb database that utilizes the DgnDb format, which is compatible with CAD applications available from Bentley Systems, Inc. It should be understood, however that such specific software and formats are merely examples.

In a second storage format (e.g., a relational database-based storage format such as DgnDb), a CAD description describing a physical structure (e.g., a building, civil infrastructure project, etc.) may be represented by, e.g., a database including a number of tables consisting of columns and rows. The rows of various tables may represent elements organized into models and associated with categories and subcategories. In this context, an element may describe an individual unit of the structure, and store information that is intrinsic to that unit. Elements may have aspects that store information that can change through the lifecycle of the element, for example, an element geometry aspect that indicates placement and size of the element. A model may group together related elements into a larger unit, with elements being atomic. Models may use a single common spatial coordinate system (a "project coordinate system") to describe the physical positioning of elements, such that the representation is coherent spatially (e.g., as opposed to being formed from a collection of "fragments" that use differing spatial coordinate systems as with the example first storage format discussed above). A category may describe a type to which an element may belong. A category may have a number of subcategories that describe properties of aspects of elements that belongs to the category. For example, an element geometry aspect may contain geometric primitives on one or more subcategories that each define a symbology (e.g., color, line weight, line style, etc.) to be used in displaying the element. A graphical view may be defined by specifying models and categories that are displayed (e.g., are "turned on"), and overrides to the default symbology of subcategories of the displayed categories (e.g., as opposed to using attachments and levels as with the example first storage format discussed above).

Figure 3:
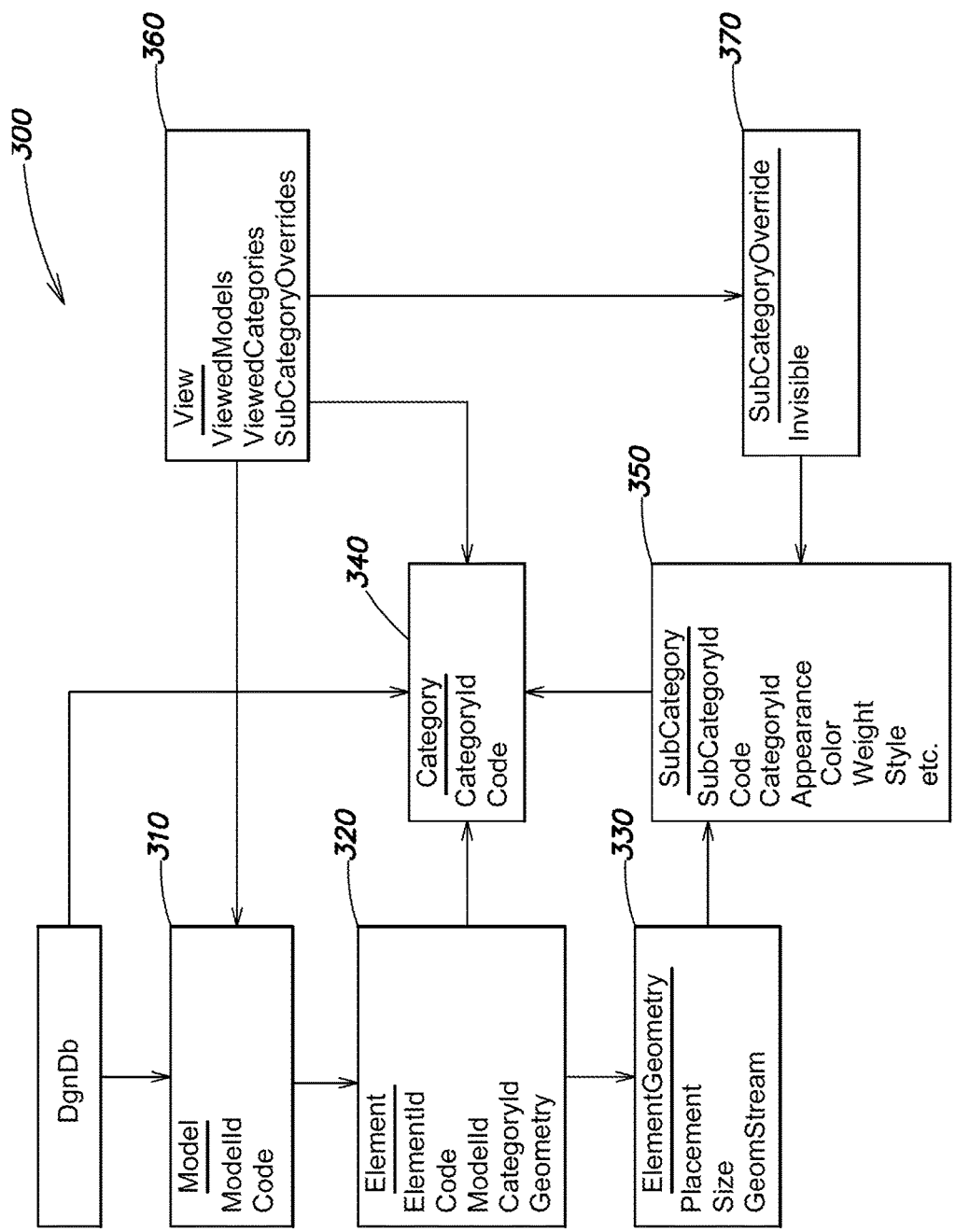
FIG. 3 is a schema of a portion of an example second storage format (e.g., a relational database-based storage format) for a CAD description that may be stored in an output repository after conversion.

FIG. 3 is a schema 300 of a portion of an example second storage format (e.g., a relational database-based storage format) for a CAD description that may be stored in an output repository after conversion. The schema 300 may represent a portion of a DgnDb format compatible with CAD applications available from Bentley Systems, Inc. However, it should be understood that similar structures may be employed in other storage formats.

In the schema 300, rows of a model table 310 represent models. Model table columns may include a model ID column that indicates a unique local identifier for the model and a code column that indicates a unique human readable name for the model. An element table 320 may include rows that represent elements. Element table columns may include an element ID column that indicates a unique identifier for the element, a code column that indicates a unique human readable name for the element, a model ID column that indicates the owning model (e.g., referencing the row of the model table 310), a category ID column that indicates a category associated with the element (e.g., referencing a row of the category table 340, such that one element may belong to one category), and a geometry column that indicates a geometry aspect for the element (e.g., referencing a row of an element geometry table 330).

Rows of the element geometry table 330 may represent geometry aspects of the referencing element. Columns of the element geometry table 330 may include placement columns that indicates a location and orientation of the element, a size columns that indicates a spatial size of the element, and a geometry stream column that holds geometric primitives that reverence one or more subcategories. Element geometry table rows may reference one or more rows of a subcategory table 350, such that one or more element geometries may reference one or more subcategories.

Rows of the category table 340 may represent categories. Columns of the category table 340 may include an element ID column that indicates a unique identifier for an element, and a code column that indicates a unique human readable name of the category. Rows of the subcategory table 350 may represent subcategories. Columns of the subcategory table 350 may include a subcategory ID column that indicates a unique identifier for the subcategory, a code column that indicates a unique human readable name of the subcategory, a category ID column that indicates the owning category (referencing a row of the category table 340, such that one or more subcategories may be owned by one category), and appearance columns, such as a color column, a weight column, a style column, etc. that define a symbology used when displaying the element.

Further, rows of a view table 360 may represent graphical views. Columns of the view table 360 may include a viewed models column that indicates models that are displayed (e.g., referencing one or more rows of the model table 320, such that one or more models may be referenced by one or more views), a viewed categories column that indicates categories that are displayed (e.g., referencing one or more rows of the category table 340, such that one or more categories may be referenced by one or more views), and a subcategory override column indicating any overrides to default display status of a subcategory (e.g., by referencing one or more rows of a subcategory override table 370 that indicate how geometry in an applicable subcategory should be displayed).

As discussed above, in some cases it may be necessary to convert a CAD description maintained according to the first storage format (e.g., the file-based storage format) of the source repository to the second storage format (e.g., the relational database-based storage format) of the output repository to enable interoperability, among other purposes. The converter 244 may apply a conversion algorithm to generate a single, coherent representation from the initial model graph of the first storage format that may include "fragments". To do so, the converter 244 defines a single coordinate system (referred to as a "project coordinate system") that is used with all models of the second storage format. The converter 244 accesses the initial model graph from the source repository. For each graphical view, a specific root model is designated, and, beginning from the designated root model, the converter 244 searches attachment paths in the initial model graph and maps each model encountered into a model of an acyclic model graph that uses the single project coordinate system. The mapping may be performed by applying each spatial transform along the attachment path to the encountered model. When a same model is encountered multiple times as a result of multiple attachment paths in the initial model graph, the converter 244 creates a new model in the acyclic model graph for each unique spatial transform. When a same model is encountered multiple times as a result of a cycle along an attachment path with the same transform, the converter 244 stops searching along that attachment path. The models of the acyclic model graph are stored according to the second storage format (e.g., the relational database-based storage format) of the output repository.

Likewise, the conversion algorithm applied by the converter 244 may preserve human-readable names and information relationships related to levels of the first storage format (e.g., the file-based storage format), despite the second storage format (e.g., the relational database-based storage format) not intrinsically utilizing model-specific levels. To do so, the converter 244 examines attachment specific copies of level structures (i.e. levels and attached levels) referenced from attachments. For each referenced level, the converter generates a category and a default subcategory of the second storage format corresponding to the respective level, where the category maintains the human-readable name of respective level, and the default subcategory indicates element display status and symbology as defined by the respective level. For each referenced attached level, the converter 244 generates a subcategory referenced by the category corresponding to the level, where the subcategory indicates element display status and symbology that overrides the display status and symbology of the default subcategory as defined by the respective attached level of the first storage format.

Figure 4:
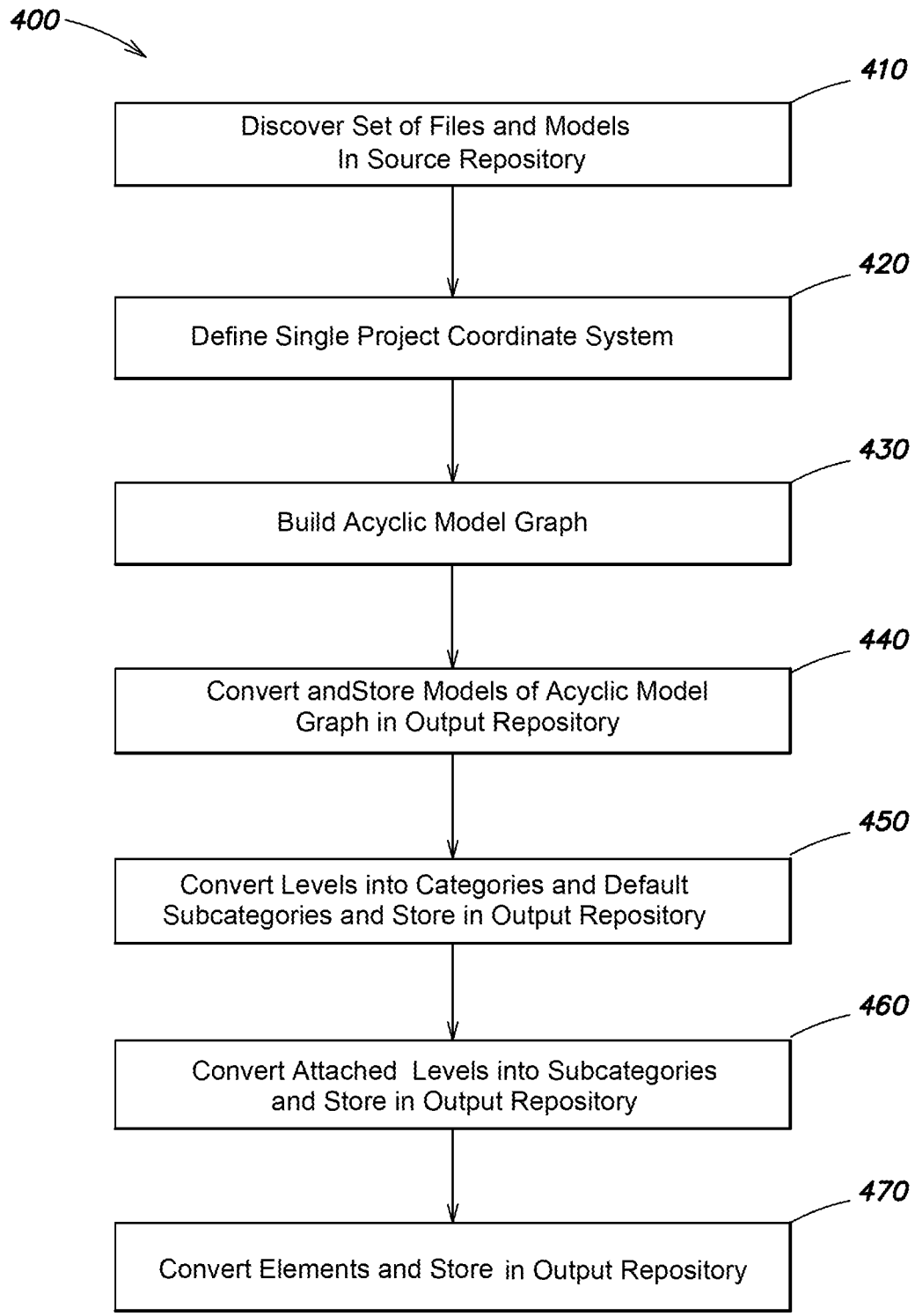
FIG. 4 is a flow diagram of an example sequence of steps that may be performed by a converter to implement the conversion algorithm.

FIG. 4 is a flow diagram of an example sequence of steps 400 that may be performed by the converter 244 to implement the conversion algorithm. At step 410, the converter 244 discovers a set of files (e.g. a root file and attached files) that include a set of models (e.g., one or more root models and one or more attached models) of first storage format (e.g., the file-based storage format) in the source repository. The set of models may be organized according to an initial model graph defined by attachments, the initial model graph potentially including multiple roots, cycles and/or multiple instantiations. At step 420, the converter 244 defines a single project coordinate system. At step 430, the converter 244, using a single designated view whose root model is the designated root model, builds an acyclic model graph that uses the project coordinate system from the initial model graph. The converter may also convert other views as part of this operation, but only views that have their root at the designated root model As part of step 430, the converter 244, beginning from a designated root model, searches attachment paths in the initial model graph and maps each model encountered into a model of the acyclic model graph by applying each spatial transforms along the attachment path to the encountered model, to determine a location in the single project coordinate system. When a same model is encountered multiple times as a result of multiple attachment paths in the initial model graph, the converter 244 creates a new model in the acyclic model graph for each unique spatial transform. When a same model is encountered multiple times as a result of a cycle along an attachment path, the converter 244 stops searching along that attachment path.

At step 440, the converter 244 converts and stores the models of the acyclic model graph according to the second storage format (e.g., the relational database-based storage format) in the output repository. In one specific implementation of step 430, for each model, the converter 244 stores a model data structure 120 into a model row in a model table 320.

At step 450, the converter 244 converts levels referenced from attachments in the acyclic model graph into categories and default subcategories of the second storage format, and stores them in the output repository. The converter 244 uses each category to maintain the human-readable name from the respective level, and each default subcategory to maintain the element display status and symbology defined by the respective level. By doing so, the converter 244 accurately preserves the identity of the levels through the conversion process, allowing one to still partition or classify elements by level. In one specific implementation of step 430, the converter 244 looks for a category row in a category table 340. If an existing category row is not found, the converter creates a new category row into which is stored the name of the respective level, and creates a subcategory row in the subcategory table 350 whose subcategory ID column is set to default, and which stores the appearance from the respective level, for example, in the color column, weight column, style column, etc. of the subcategory row. Conversely, if an existing category row is found, the level is simply mapped to that category row and its corresponding default subcategory row.

At step 460, the converter 244 converts a designated graphical view into the second storage format and stores it in the output repository. As part of step 440, for each attached level of paths through the acyclic model graph associated with the view, the converter 244 generates a subcategory referenced by the category corresponding to the level, where the subcategory maintains element display status and symbology that overrides the element display status and symbology of the default subcategory as defined by the attached level. In this manner, attachment specific overrides are maintained in unique subcategories for use by the elements. In one specific implementation of step 440, to convert the view, the converter 244 begins with the root model of the view and visits each attachment data structure 160 in the graph and each attached level data structure 170 for that attachment data structure 160. For each such attached level data structure 170, it looks up the category row with the same name of the category table 340. It then compares the display status and appearance of the attached level with the corresponding properties of the default subcategory in the subcategory table 350 for that category row. If they are not equal, the converter 244 creates a new subcategory row in the subcategory table 350 that stores the appearance (such as color, line weight, line style, etc.). If they are equal, the subcategory row in the subcategory table 350 whose subcategory ID column is set to default is used. A similar procedure is used for converting other views of the first storage format of the source repository to the second storage format of the output repository, where the root model of the view is the same as that of the designated view.

At step 470, the converter 244 converts elements referenced from models of the acyclic model graph into elements of the second storage format and stores them in the output repository. As part of step 450, the converter 244 traverses elements of attachments, and creates elements of the second storage format that are associated with the category created for the element's original level of the first storage format, and creates element geometry of the second storage format that is associated with the subcategory created for the element's original level of the first storage format. In one specific implementation of step 450, for each model, for each element data structure 130, the converter 244 converts the element data structure 130 into an element row in the element table 320 associated with a category row of the category table 340 created based on the element's original level ID, and a creates an element geometry row in the element geometry table 330 associated with a subcategory ID based on the element's original level ID.

Figure 5:
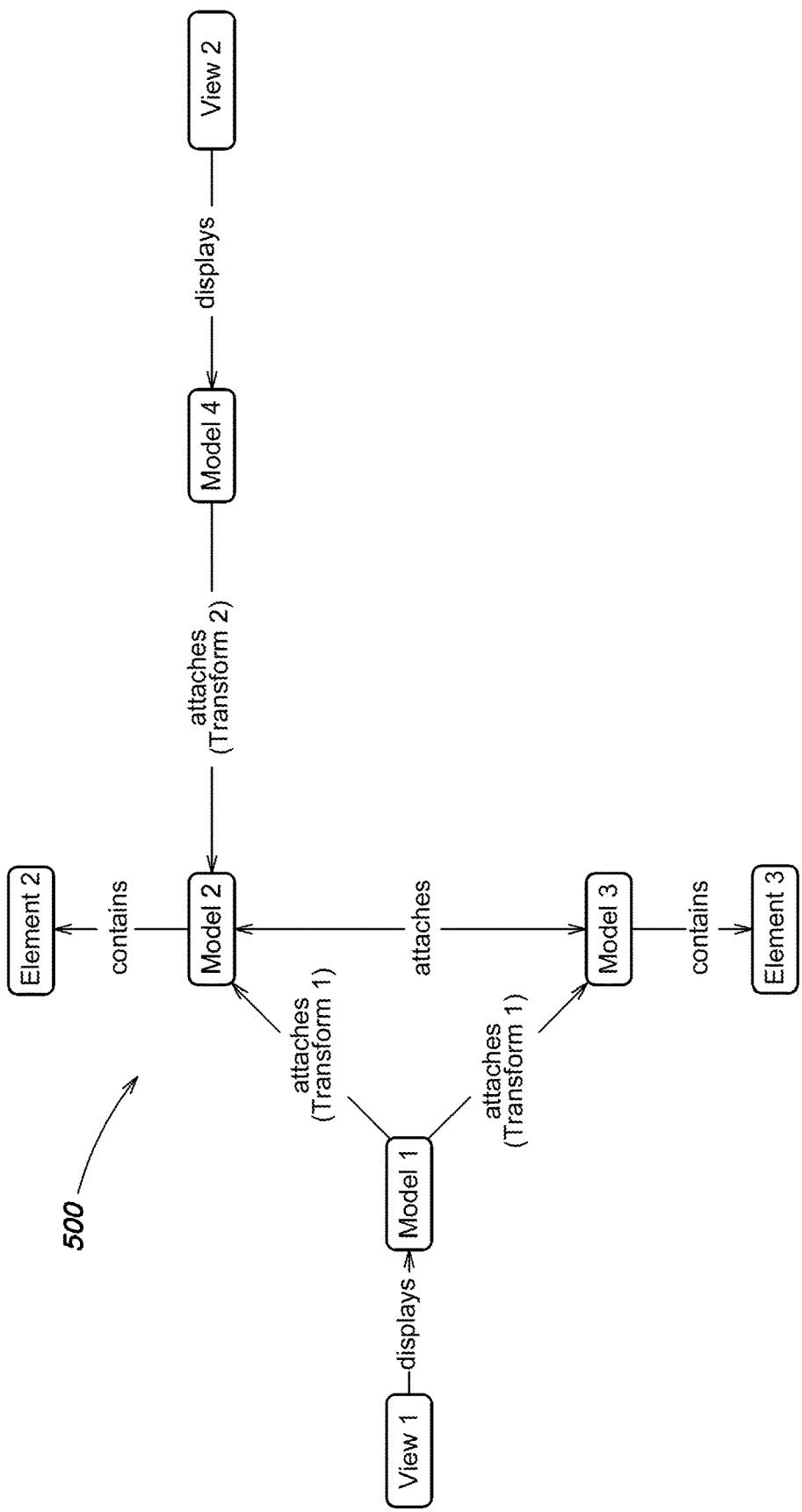
FIG. 5 is a simplified diagram 500 an example CAD description in the first storage format (e.g., the file-based storage format) that includes multiple roots and cycles, before any conversion.

The operation of the sequence of steps 400 of FIG. 4 may be better understood by considering their application to several simple example CAD descriptions. The first example illustrates conversion from a model graph that includes multiple roots and cycles. FIG. 5 is a simplified diagram 500 showing an example CAD description in the first storage format (e.g., the file-based storage format) that includes multiple roots and cycles, before any conversion. Each of the models of the example CAD description may reside in a separate file. The example CAD description includes a first root model ("Model 1") that represents a physical description that uses a spatial coordinate system, and a second root model ("Model 4") that uses its own spatial coordinate system. Additional models include elements ("Model 2" including "Element 2" and "Model 3" including "Element 3") are defined using their own spatial coordinate system. Model 1 attaches to Model 2 and Model 3 using a first spatial transform ("Transform 1") that relates the spatial coordinate system of Model 2 and Model 3 to that of Model 1. Model 4 attaches to Model 2 using a second spatial transform ("Transform 2") that relates the spatial coordinate system of Model 2 to that of Model 4. Model 2 attaches to Model 3, and Model 3 attaches to Model 2, (thereby creating a cycle) using the identity transform. As a result of the multiple roots and cycles, in this example there are three distinct ways of interpreting the location of Element 2 and Element 3: when viewed from Model 1, Element 2 and Element 3 may be in a first location, when viewed from Model 4, Element 2 and Element 3 may be in a second location, and when viewed from Model 2 or Model 3, Element 2 and Element 3 may be in a third location.

Figure 6:
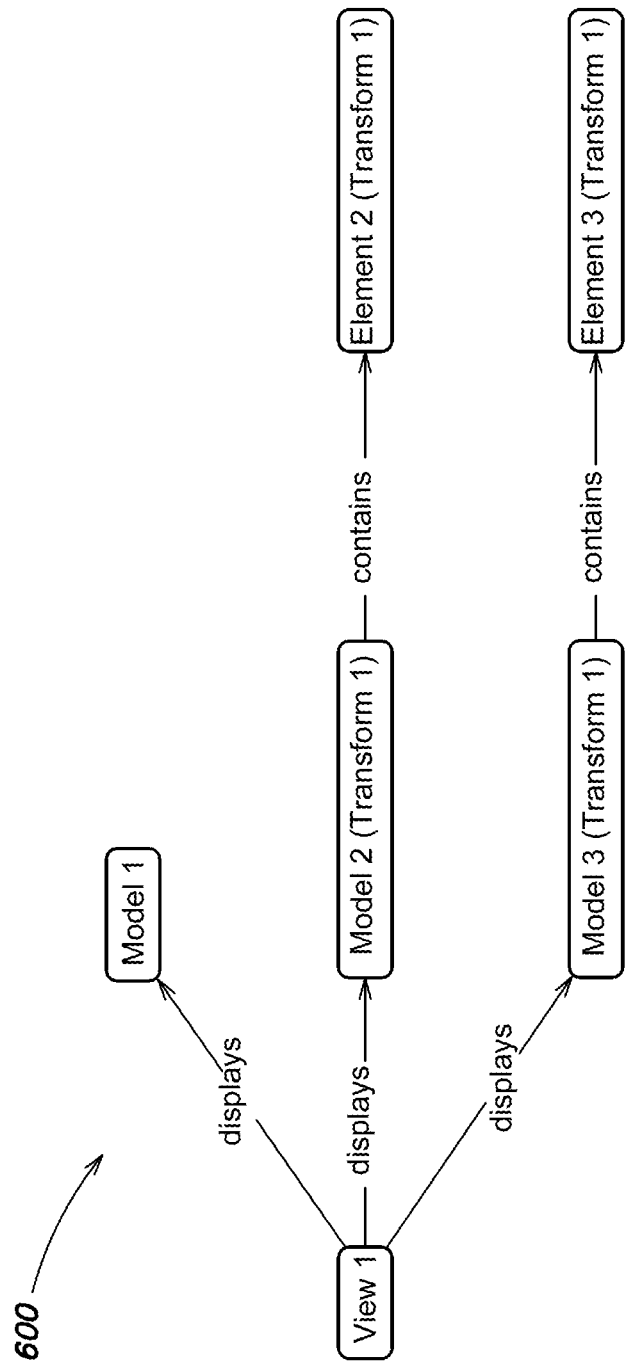
FIG. 6 is a simplified diagram showing results of conversion of the example CAD description of FIG. 5 to the second storage format (e.g., the relational database-based storage format)

FIG. 6 is a simplified diagram 600 showing results of conversion of the example CAD description of FIG. 5 to the second storage format (e.g., the relational database-based storage format). In this example, Model 1 has been selected as the designated root model. The converter 244 has built an acyclic model graph by following attachment paths from Model 1 and applying each spatial transform along the attachment path to each encountered model, breaking cycles as needed (i.e., here the cycle between Model 2 and Model 4). In the post-conversion CAD description, a view directly references Model 1, Model 2 and Model 3. Model 1, Model 2 and Model 3 are all within the same project coordinate system. Transform 1 has been applied to Model 2. Model 2 includes Element 2 transformed to be in the project coordinate system by application of Transform 1 to its original local spatial coordinate system. Transform 1 has also been applied to Model 3. Model 3 includes Element 3 transformed to be in the project coordinate system by application of Transform 1 to its original local spatial coordinate system. Model 4 is unreachable from Model 1 and is not converted.

Figure 7:
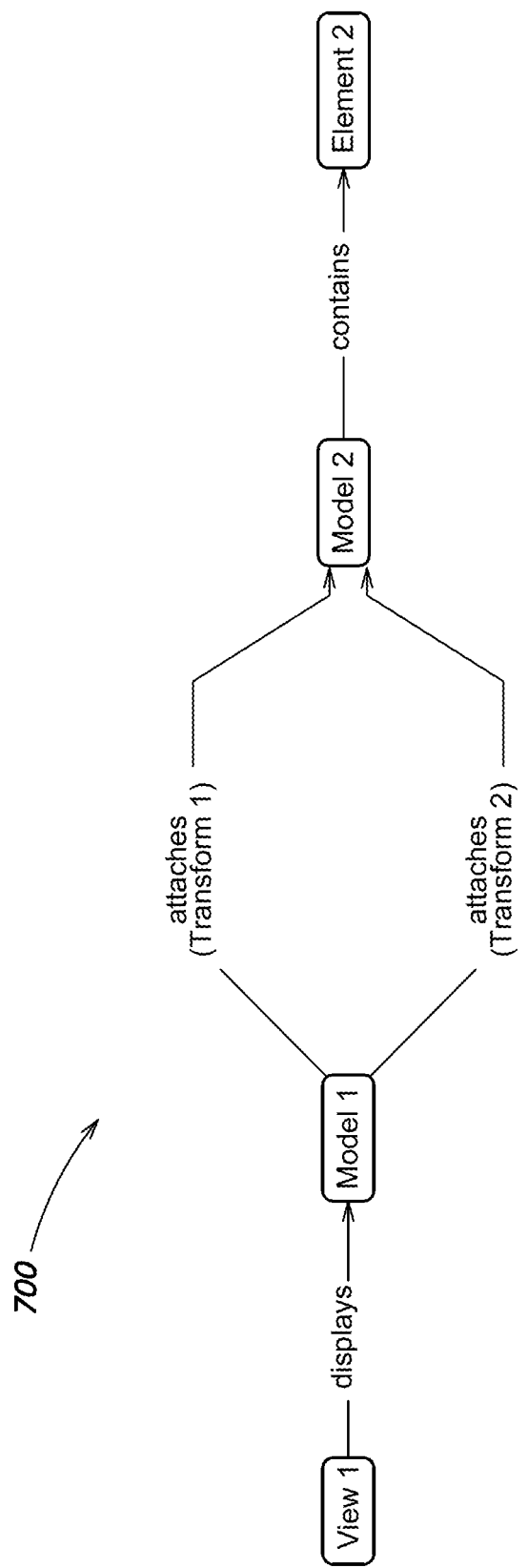
FIG. 7 is a simplified diagram showing an example CAD description in the first storage format (e.g., the file-based storage format) that includes multiple instantiations.

The second example illustrates conversion from a model graph that includes multiple instantiations. FIG. 7 is a simplified diagram 700 showing an example CAD description in the first storage format (e.g., the file-based storage format) that includes multiple instantiations. The example CAD description includes a first model ("Model 1") that serves as a root model and a second model ("Model 2") that includes an element ("Element 2"). Model 1 attaches to Model 2 by two different attachments, one that uses a first transform ("Transform 1") and one that uses a second, different transform ("Transform 2"). As a result, while only a single Element 2 is stored, when Model 1 is displayed, two instantiations of Element 2 will be shown, in different locations.

Figure 8:
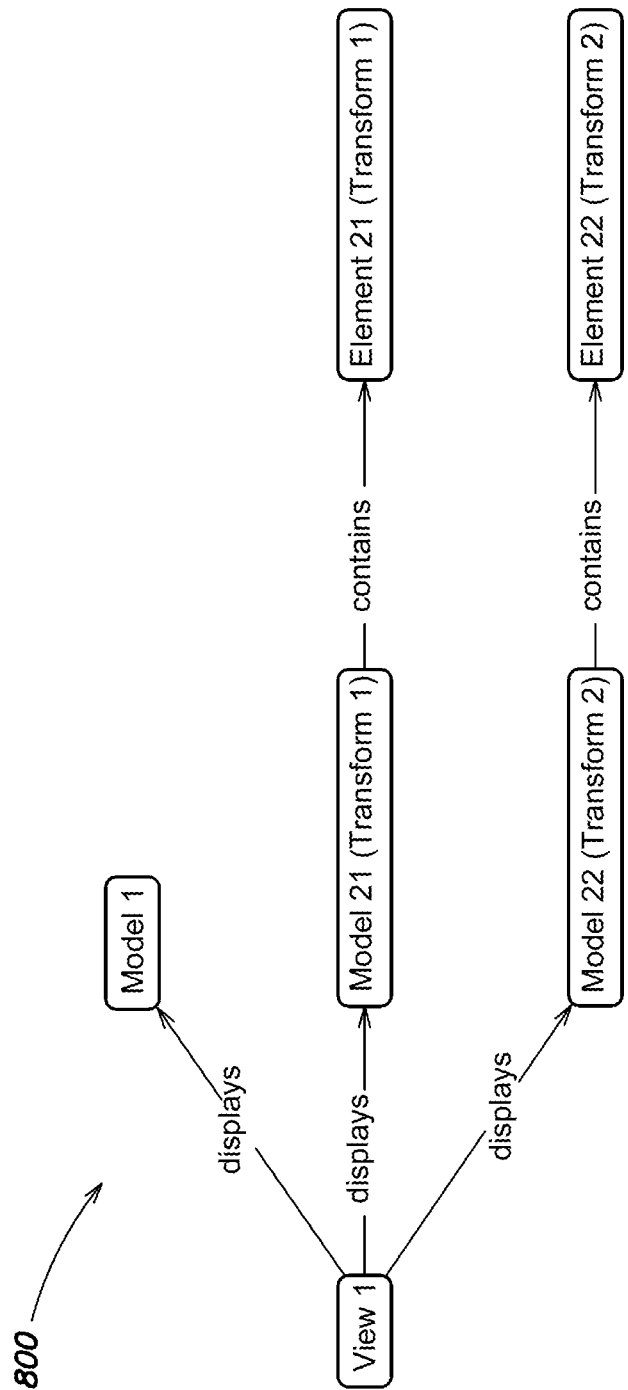
FIG. 8 is a simplified diagram showing results of conversion of the example CAD description of FIG. 7 to the second storage format (e.g., the relational database-based storage format)

FIG. 8 is a simplified diagram 800 showing results of conversion of the example CAD description of FIG. 7 to the second storage format (e.g., the relational database-based storage format). In this example, Model 1 has been selected as the designated root model. The converter 244 has built an acyclic model graph by following attachment paths from Model 1 and applying each spatial transform along the attachment path to each encountered model, duplicating models in the acyclic model graph for each unique spatial transform used to reach a model (i.e., here each unique transform used to read Model 2. Model 2 has been duplicated to create both "Model 21" that results from Transform 1 being applied to Model 2, and "Model 22" which results from Transform 2 being applied to Model 2. Model 1, Model 21 and Model 22, which are all defined within the same project coordinate system. Model 21 includes Element 2 transformed to be in the project coordinate system by application of Transform 1 to its original local spatial coordinate system. Model 22 includes Element 1 transformed to be in the project coordinate system by application of Transform 2 to its original local spatial coordinate system. In the post-conversion CAD description, a view references Model 1, Model 21 and Model 22. It should be understood that the duplication of models an application of transforms is recursive, such that if there were additional models attached to Model 2, such models would each be duplicated into the project coordinate system and attached directly to the view.

Figure 9:
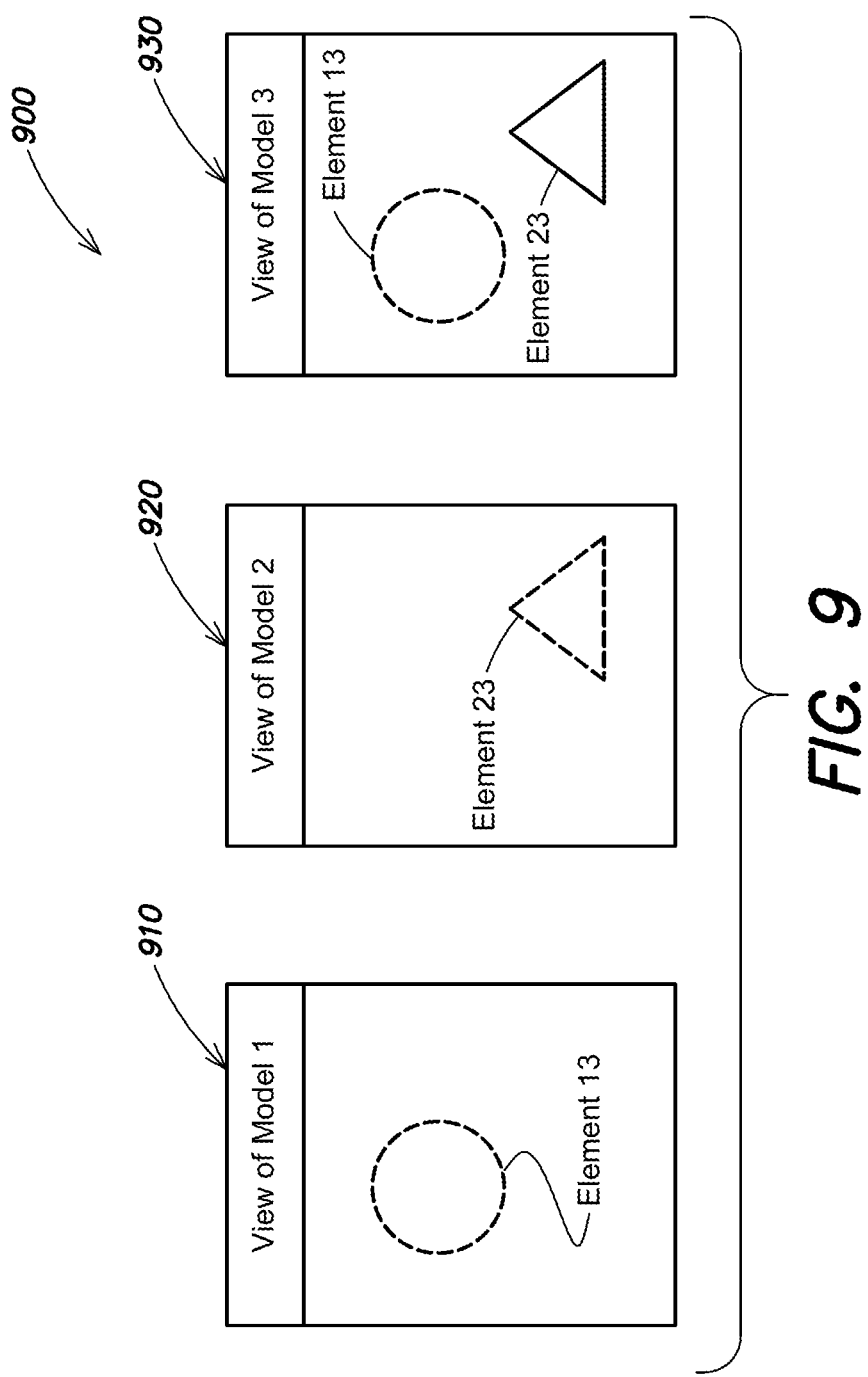
FIG. 9 is a series of example graphical views of a simple example CAD description.

The third example illustrates conversion of graphical views while preserving human-readable names and information relationships. FIG. 9 is a series of example graphical views 900 of a simple example CAD description. The example CAD description includes an element ("Element 13") represented as a circle which belongs to a first model ("Model 1"), and another element ("Element 23") represented as a triangle which belongs to a second model ("Model 2"). Model 1 is displayed by a first view 910 and Model 2 is displayed by a second view 920. A third model ("Model 3") is a combination of Model 1 and Model 2, with the symbology of Element 23 overridden, specifically the line style overridden from dashed to solid. Model 3 is displayed by a third view 930. It should be understood that a practical CAD description would generally include a far larger number of displayed elements, which could be organized into a greater number of models, from which a greater number of graphical views could be produced.

Figure 10:
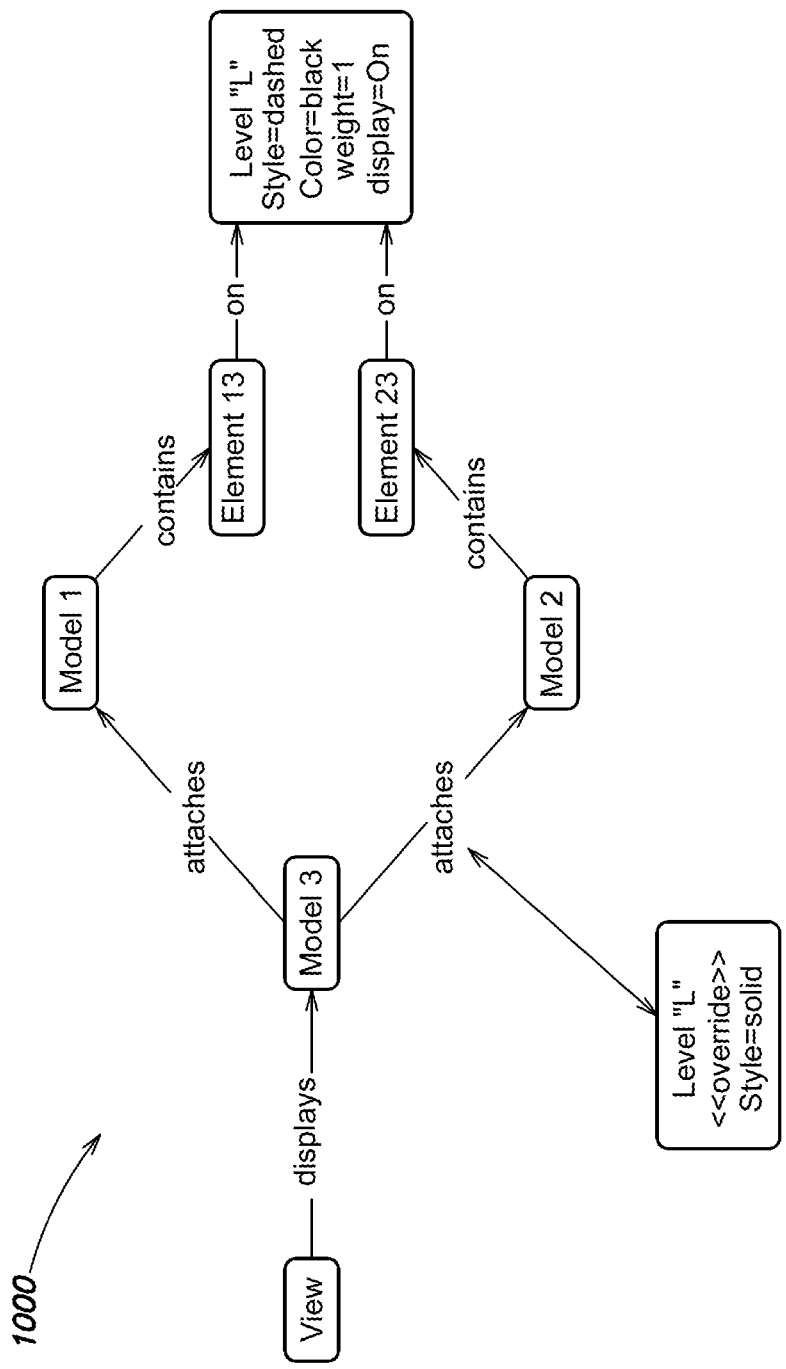
FIG. 10 is a simplified diagram showing how a first storage format (e.g., a file-based storage format) before a conversion may represent the third view of Model 3 shown in FIG. 9.

FIG. 10 is a simplified diagram 1000 showing how a first storage format (e.g., a file-based storage format) before a conversion may represent the third view 930 of Model 3 shown in FIG. 9. Before conversion, Model 3 attaches to Model 1 and Model 2. The attachment to Model 2 defines an override for level "L" that changes default symbology to use, among other things, a solid line style. Model 1 contains Element 13 and Model 2 contains Element 23. Both Element 13 and Element 23 reference level "L" which defines a default symbology including, among other things, use of a dashed line style.

Figure 11:
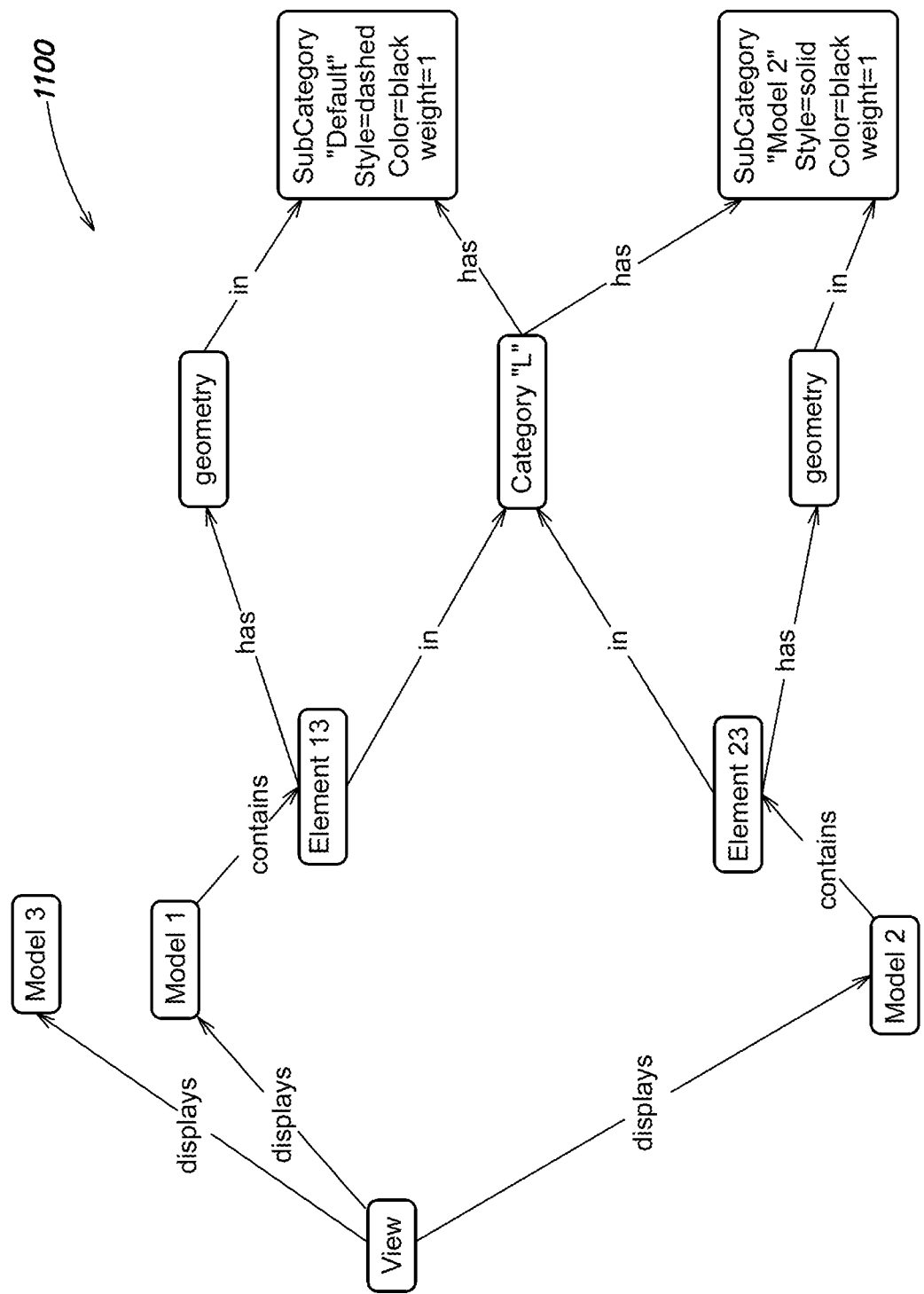
FIG. 11 is a simplified diagram showing results of conversion of Model 3 in FIG. 10 to the second storage format (e.g., the relational database-based storage format)

FIG. 11 is a simplified diagram showing results of conversion of Model 3 in FIG. 10 to the second storage format (e.g., the relational database-based storage format). The view displays Model 1, Model 2 and Model 3. Model 1 contains Element 13 and Model 2 contains Element 23. Element 13 has geometry and is part of a category "L". The geometry is related to a default subcategory of the category. The subcategory indicates default symbology including, among other things, use of a dashed line style. Likewise, Element 23 has geometry and is part of the category "L". The geometry is related to another subcategory of the category. The subcategory indicates changes to the default symbology including, among other things, changes to default symbology to use a solid line style.

The conversion algorithm described above may be adapted to cover a variety of different special cases. One example special case involves creating a single, coherent representation in the second storage format (e.g., the relational database-based storage format) from a number of explicitly enumerated "fragments" in the first storage format (e.g., the file-based storage format) that are not necessarily attached to each other through model attachments (referred to generally, as an "explicit fragments" conversion). Such a case may arise, for example, in the conversion of maps from the first storage format to the second storage format. Large maps may be maintained in the first storage format as a number of uniformly shaped (e.g., square) tiles that each are stored as a model in a separate file. There may not be stored attachments among the models of the separate files. To perform a conversion, the converter 244 may be supplied an indication of a designated root model and an explicit list of the files in the source repository and corresponding spatial transforms to be applied to the models of those files. The converter 244 treats the models of the list of files as a model graph rooted at the designated root model, related by the corresponding spatial transforms to the designated root model. The converter 244 then converts this model graph to a single, coherent representation in the second storage format. The representation in the second storage format may preserve each model of the first storage format, or may condense the model graph to include a lesser number of models (e.g., such that all elements are contained within one model or some other smaller number of models) after conversion.

Figure 12:
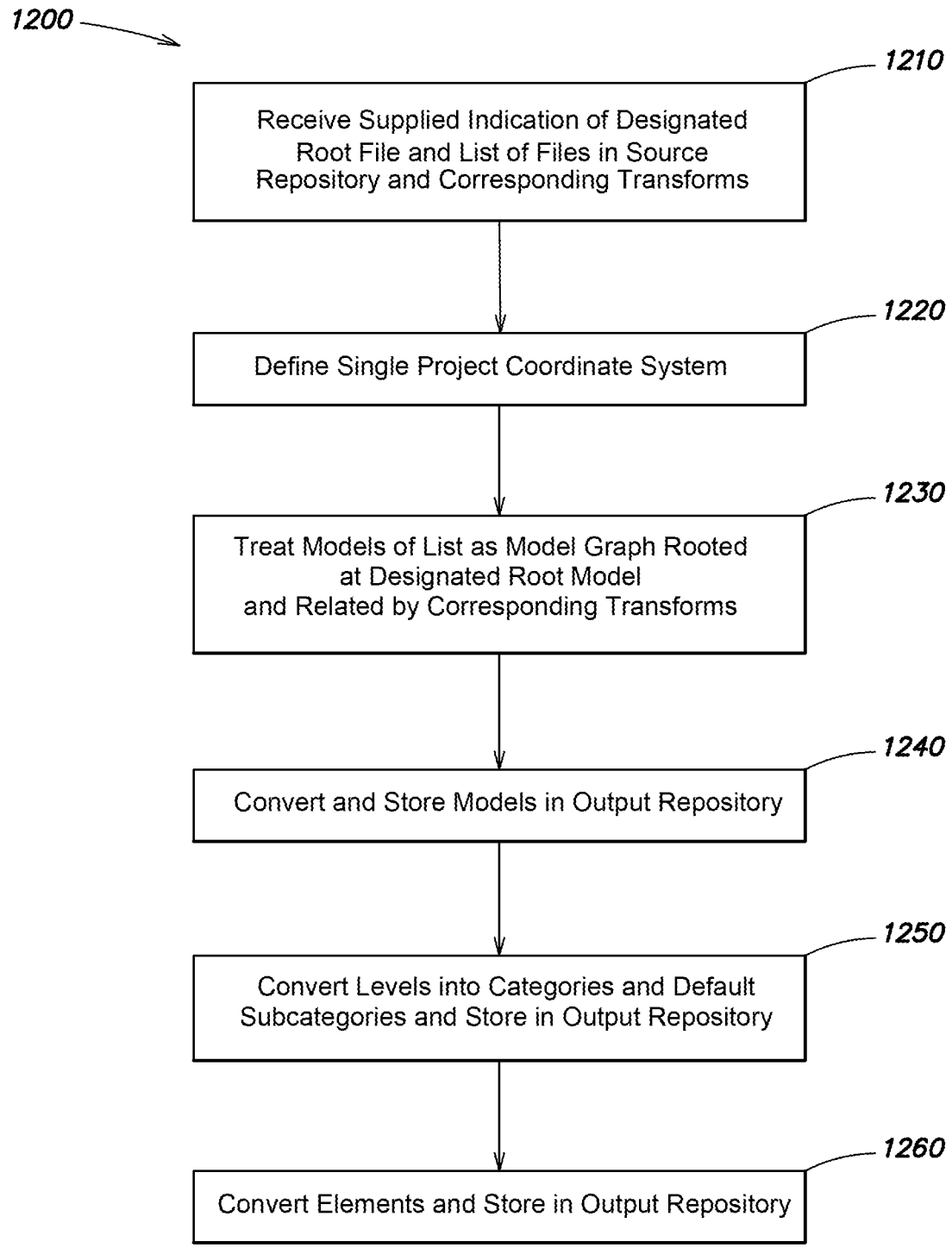
FIG. 12 is a flow diagram of an example sequence of steps that may be performed by a converter to implement an "explicit fragments" conversion.

FIG. 12 is a flow diagram of an example sequence of steps 1200 that may be performed by the converter 244 to implement an "explicit fragments" conversion. At step 1210, the converter 244 receives a supplied indication of a designated root model and a list of the files in the source repository and corresponding spatial transforms to be applied to the models of those files. The root model may or may not be one of the models of the files of the list. At step 1220, the converter 244 defines a single project coordinate system. The single project coordinate system may be the coordinate system used by the designated root model, or some other coordinate system. At step 1230, the converter 244 treats the models of the list of files as a model graph rooted at the designated root model, related by the corresponding spatial transforms to the designated root model. At step 1240, the converter 244 the models of the model graph to the second storage format (e.g., the relational database-based storage format) and stores them in the output repository. At step 1250, similar to step 450 of FIG. 4 discussed above, the converter 244 converts levels referenced in the model graph into categories and default subcategories of the second storage format, and stores them in the output repository. In an "explicit fragments" conversion, there are typically no attached levels, and as such, operations similar to step 460 of FIG. 4 discussed above may not be performed. At step 1270, similar to step 470 of FIG. 4 discussed above, the converter 244 converts elements included in the models of the model graph into elements of the second storage format and stores them in the output repository.

Figure 13:
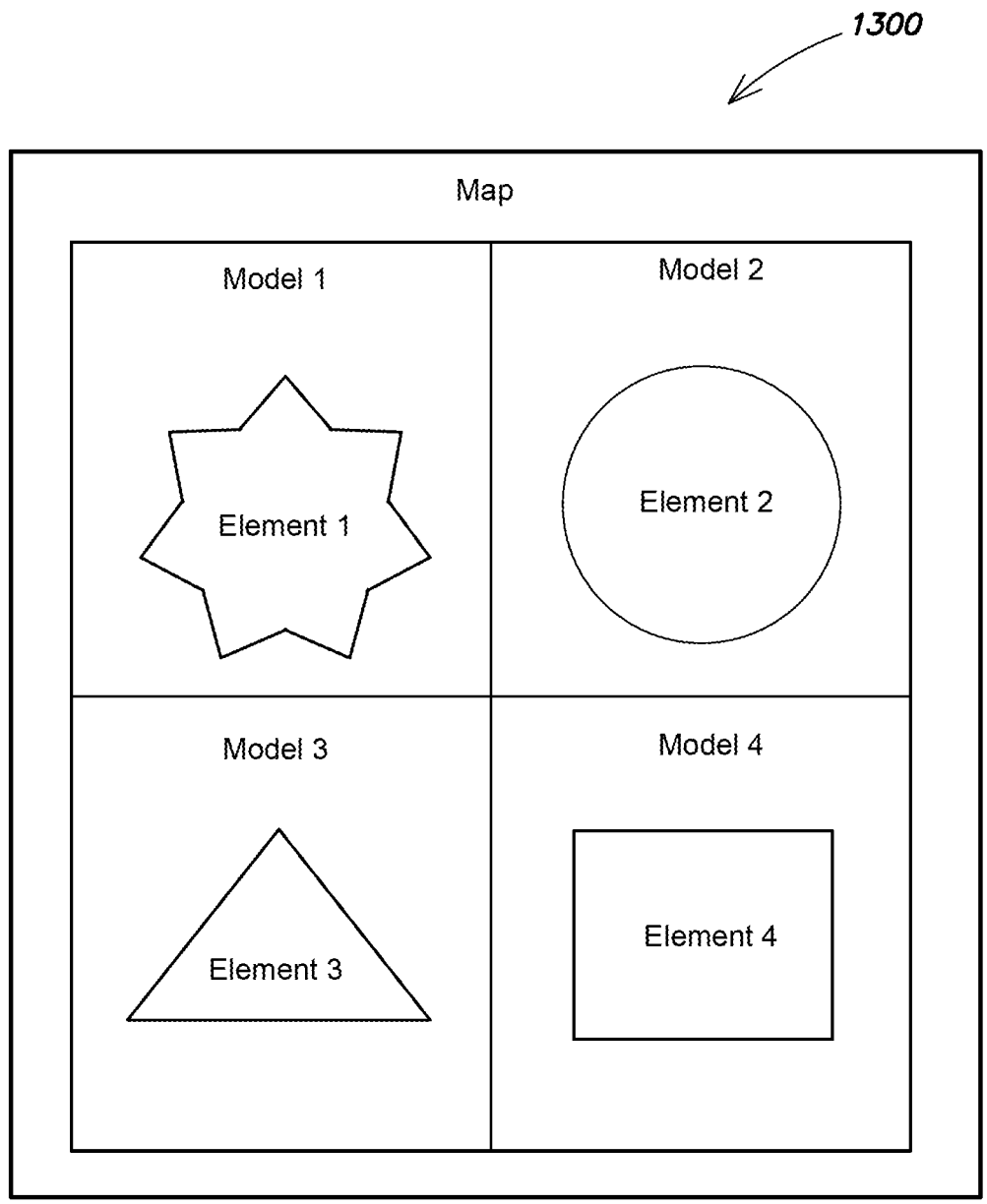
FIG. 13 is an example map composed of tiles that are represented by models composed of elements.

The operation of FIG. 12 may be better understood by considering their application to a simple example CAD description. FIG. 13 is an example map composed of tiles that are represented by models composed of elements. A first tile is represented by a first model ("Model 1") that includes a first element ("Element 1"), a second tile is represented by second model ("Model 2") that includes a second element ("Element 2"), a third tile is represented by a third model ("Model 3") that includes a third element ("Element 3"), and a fourth tile is represented by fourth model ("Model 4") that includes a fourth element ("Element 4"). While each model is shown including only a single element in this simple example, it should be understood that models in practical implementations typically will include a far greater number of elements.

Figure 14:
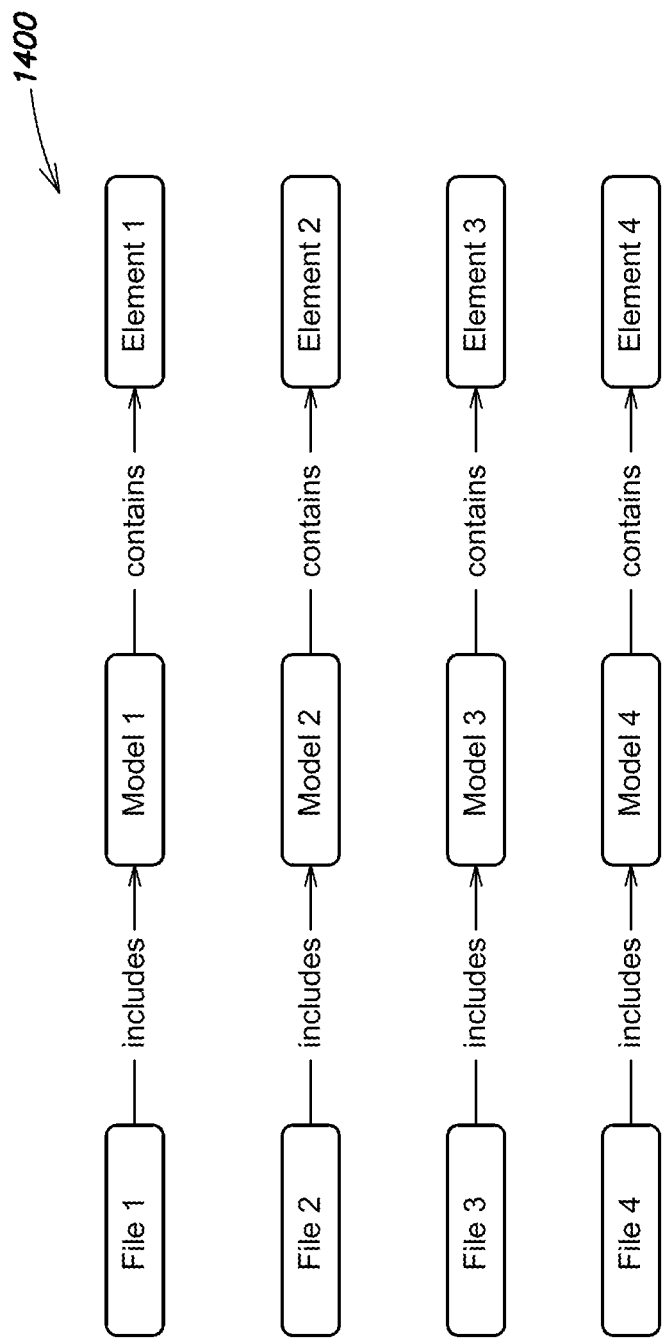
FIG. 14 is a simplified diagram showing an example CAD description in the first storage format (e.g., the file-based storage format) that includes the models representing the individual tiles of the map from FIG. 13.

FIG. 14 is a simplified diagram 1400 showing an example CAD description in the first storage format (e.g., the file-based storage format) that includes the models representing the individual tiles of the map from FIG. 13. A first file ("File 1") includes Model 1, a second file ("File 2") includes Model 2, a third file ("File 3") include Model 3, and a fourth file ("File 4") includes Model 4. No attachments exist between Model 1, Model 2, Model 3 and Model 4. Further, each model may use its own spatial coordinate system. While no additional models are shown attached to Model 1, Model 2, Model 3 and Model 4 in this simple example, it should be understood that there could be additional models attached to each of these models that include additional elements.

Figure 15:
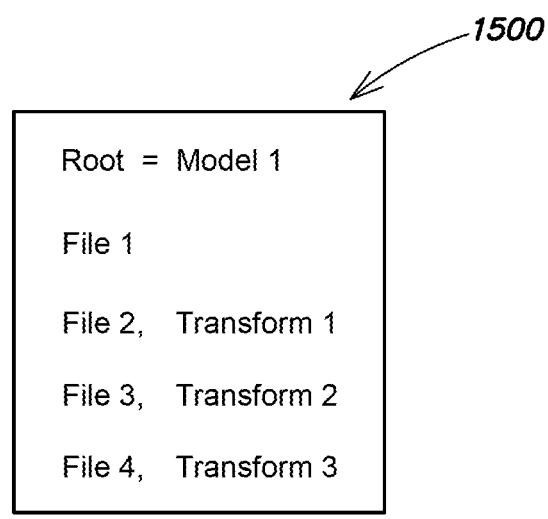
FIG. 15 is example information that may be supplied to the converter in connection with conversion of the example CAD description of FIGS. 13-14.

FIG. 15 is example information 1500 that may be supplied to the converter 244 in connection with conversion of the example CAD description of FIGS. 13-14. The supplied information in this example includes an indication that Model 1 should be treated as the designated root model, and a list of files that includes File 1 with no corresponding spatial transform, File 2 with a first corresponding spatial transform ("Transform 1"), File 3 with a second corresponding spatial transform ("Transform 2"), and File 4 with a third corresponding spatial transform ("Transform 3").

Figure 16:
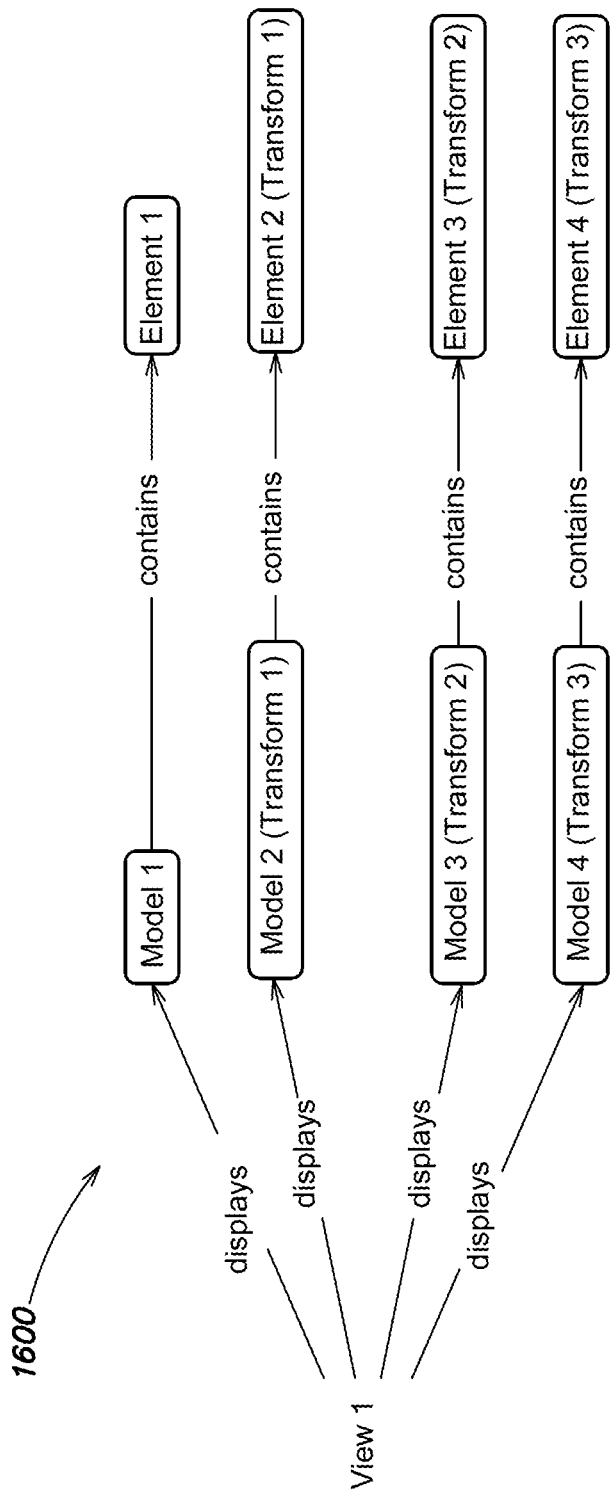
FIG. 16 is a simplified diagram showing results of conversion of the example CAD description of FIGS. 13-14 to the second storage format (e.g., the relational database-based storage format), preserving each model of the first storage format.

FIG. 16 is a simplified diagram 1600 showing results of conversion of the example CAD description of FIGS. 13-14 to the second storage format (e.g., the relational database-based storage format), preserving each model of the first storage format. The converter 244 has treated the models from the files of the list of files as a model graph rooted at Model 1, and has applied each corresponding spatial transform to the models (and the elements thereof). In the post-conversion CAD description, a view directly references Model 1, Model 2, Model 3 and Model 4, all within the same project coordinate system. Transform 1 has been applied to Model 2. Model 2 includes Element 2 transformed by application of Transform 1. Transform 2 has been applied to Model 3. Model 3 includes Element 3 transformed by application of Transform 2. Finally, Transform 3 has been applied to Model 4. Model 4 includes Element 4 transformed by application of Transform 3.

Figure 17:
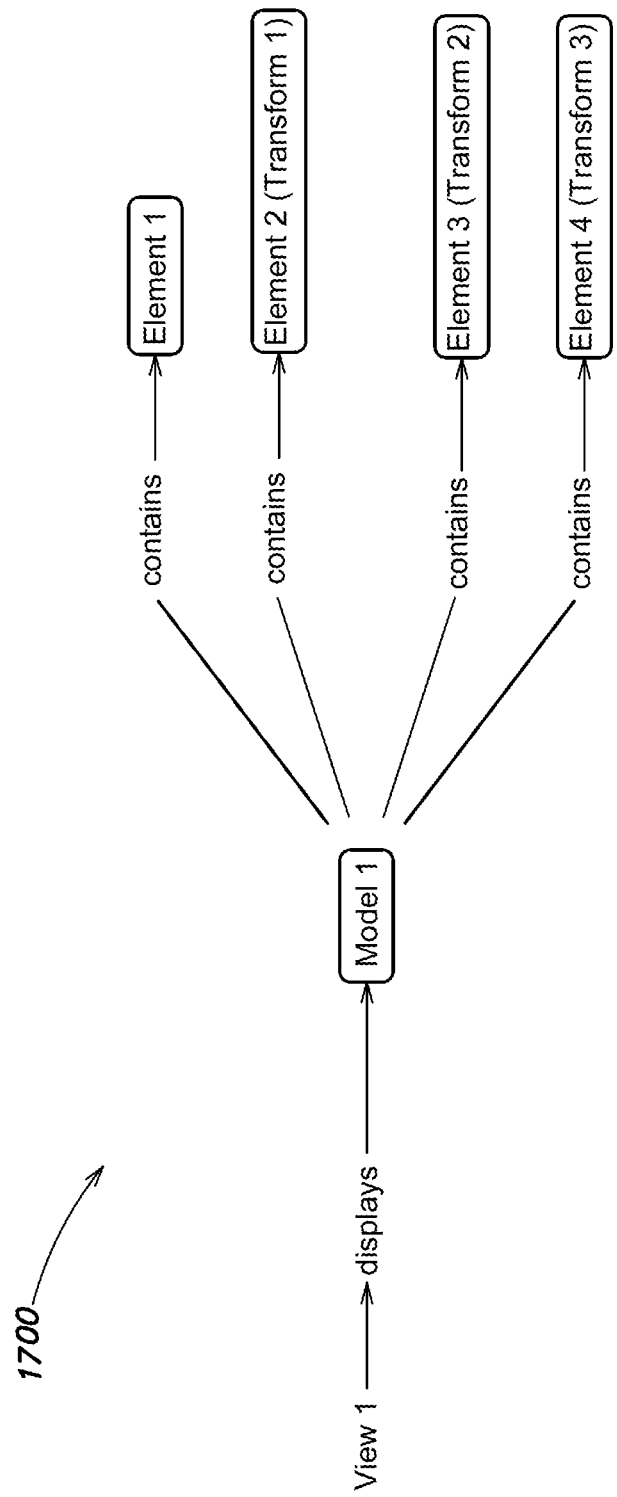
FIG. 17 is a simplified diagram showing results of conversion of the example CAD description of FIGS. 13-14 to the second storage format (e.g., the relational database-based storage format), condensing the models of the first storage format to a single model.

FIG. 17 is a simplified diagram 1700 showing results of conversion of the example CAD description of FIGS. 13-14 to the second storage format (e.g., the relational database-based storage format), condensing the models of the first storage format to a single model. As in FIG. 16, the converter 244 applied each corresponding spatial transform to elements of the models. Further, the converter 244 has eliminated Models 2-4 as no longer needed, transferring ownership of all elements to Model 1. As such, in the post-conversion CAD description, a view directly references Model 1, which includes Element 1, Element 2 transformed by application of Transform 1, Element 3 transformed by application of Transform 2, and Element 4 transformed by application of Transform 3.

Concluding Comments

The above disclosure details several techniques for converting a CAD description maintained in a first storage format of a source repository to a second storage format of an output repository. It should be understood that further adaptations and modifications may be made to the above discussed techniques. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for converting a computer aided design (CAD) description maintained in a first storage format to a second storage format, the method comprising:
   accessing, by a converter executing on an electronic device from a source repository, an initial model graph in the first storage format, the initial model graph including one or more root models related by attachments to one or more attached models, wherein each model of the model graph is associated with a respective spatial coordinate system that defines an arrangement of elements for that model, and at least one of the attachments includes a spatial transform that relates a spatial coordinate systems used by the attached model to that of an owning model in the model graph,
   building, by the converter executing on the electronic device, an acyclic model graph from the initial model graph by:
      receiving an indication of a designated root model from the one or more root models, and
      beginning from the designated root model, searching attachment paths in the initial model graph and mapping each model encountered into a model of the acyclic model graph that uses a single project coordinate system, by applying each spatial transform along the attachment path to the encountered model;
   storing the models of the acyclic model graph to an output repository according to the second storage format
   accessing and displaying a graphical view of at least one of the models of the acyclic model graph in the output repository by a CAD application executing on the electronic device or another electronic device.

2. The method of claim 1, wherein the building further includes:
   when a same model is encountered multiple times as a result of multiple attachment paths in the initial model graph, creating a new model in the acyclic model graph for each unique spatial transform.

3. The method of claim 1, wherein the building further includes:
   when a same model is encountered multiple times as a result of a cycle along an attachment path with a same transform, stopping searching along that attachment path.

4. The method of claim 1, wherein the first storage format is a file-based storage format and the second storage format is a relational database-based storage format.

5. The method of claim 4, wherein the file-based storage format is a DgnV8 format and the relational database-based storage format is a DgnDb format.

6. The method of claim 1, wherein the one or more root models in the model graph are a plurality of root models, wherein attachment paths from a first root model defines a physical assembly of elements and attachment paths from at least a second root model defines a graphical view, the attachment paths defining the graphical view associated with one or more attachment specific copies of levels.

7. The method of claim 6, wherein the method further comprises converting the graphical view to the second storage format by:
   for each level indicated by attachments of the attachment paths defining the graphical view, generating, by the converter executing on the electronic device, a category and a default subcategory corresponding to the respective level, the default subcategory maintaining a display status and symbology defined by the respective level;
   for each level indicated by attachments of the attachment paths defining the graphical view, generating, by the converter executing on the electronic device, a subcategory referenced by the category corresponding to the level, the subcategory maintaining a display status and symbology that overrides the display status and symbology maintained by the default subcategory; and
   storing the categories and subcategories in the output repository.

8. A non-transitory electronic device-readable medium containing executable instructions to convert a computer aided design (CAD) description maintained in a first storage format to a second storage format, the executable instructions, when executed by one or more processors of one or more electronic devices operable to:
   access an initial model graph in the first storage format, the initial model graph including a plurality of root models related by attachments to one or more attached models, wherein each model of the model graph is associated with a respective spatial coordinate system that defines an arrangement of elements for that model, and at least one of the attachments includes a spatial transform that relates a spatial coordinate systems used by the attached model to that of an owning model in the model graph,
   build an acyclic model graph from the initial model graph by:
      receiving an indication of a designated root model from the plurality of root models, and
      beginning from the designated root model, searching attachment paths in the initial model graph and mapping each model encountered into a model of the acyclic model graph that uses a single project coordinate system, by applying each spatial transform along the attachment path to the encountered model;
   storing the models of the acyclic model graph in the second storage format; and
   access and display a graphical view of at least one of the models of the acyclic model graph.

9. The non-transitory electronic device-readable medium of claim 8, wherein the executable instructions, when executed by the one or more processors of the one or more electronic devices, are further operable to:
   build the acyclic model graph by, when a same model is encountered multiple times as a result of multiple attachment paths in the initial model graph, creating a new model in the acyclic model graph for each unique spatial transform.

10. The non-transitory electronic device-readable medium of claim 8, wherein the executable instructions, when executed by the one or more processors of the one or more electronic devices, are further operable to:
build the acyclic model graph by, when a same model is encountered multiple times as a result of a cycle along an attachment path with a same transform, stopping searching along that attachment path.

11. The non-transitory electronic device-readable medium of claim 8, wherein the first storage format is a file-based storage format and the second storage format is a relational database-based storage format.

12. The non-transitory electronic device-readable medium of claim 11, wherein the file-based storage format is a DgnV8 format and the relational database-based storage format is a DgnDb format.

13. The non-transitory electronic device-readable medium of claim 8, wherein the one or more root models in the model graph are a plurality of root models, wherein attachment paths from a first root model defines a physical assembly of elements and attachment paths from at least a second root model defines a graphical view, the attachment paths defining the graphical view associated with one or more attachment specific copies of levels.

14. The non-transitory electronic device-readable medium of claim 13, wherein the executable instructions, when executed by the one or more processors of the one or more electronic devices, are further operable to convert the graphical view to the second storage format by:
for each level indicated by attachments of the attachment paths defining the graphical view, generating, by the converter executing on the electronic device, a category and a default subcategory corresponding to the respective level, the default subcategory maintaining a display status and symbology defined by the respective level;
for each level indicated by attachments of the attachment paths defining the graphical view, generating, by the converter executing on the electronic device, a subcategory referenced by the category corresponding to the level, the subcategory maintaining a display status and symbology that overrides the display status and symbology maintained by the default subcategory.

15. An electronic device configured to convert a computer aided design (CAD) description maintained in a first storage format to a second storage format, the electronic device comprising:
a display screen;
a processor configured to execute executable instructions; and
a memory configured to store the executable instructions and data, the executable instructions and data including:
a source repository configured to store the CAD description in the first storage format,
an output repository configured to store the CAD description in the second storage format,
a CAD application configured to access the output repository to display the CAD description on the display screen, and
a converter configured to generate the CAD description in the output repository based on the CAD description in the source repository by:

accessing an initial model graph in the first storage format from the source repository, the initial model graph including models related by attachments, wherein each model of the model graph is associated with a respective spatial coordinate systems that defines an arrangement of elements for that model, and at least one of the attachments includes a spatial transform that relates a spatial coordinate systems used by an attached model to that of an owning model in the model graph,
building an acyclic model graph from the initial model graph by, beginning from a root model, searching attachment paths in the initial model graph and mapping each model encountered into a model of the acyclic model graph by applying each spatial transform along the attachment path to the encountered model, and when a same model is encountered multiple times as a result of multiple attachment paths in the initial model graph, creating a new model in the acyclic model graph for each unique spatial transform, and when a same model is encountered multiple times as a result of a cycle along an attachment path with a same transform, stopping searching along that attachment path, and
storing the models of the acyclic model graph to the output repository in the second storage format.

16. A method for converting a computer aided design (CAD) description maintained in a first storage format to a second storage format, the method comprising:
receiving, by a converter executing on an electronic device, a supplied indication of a designated root model and an enumeration of files and corresponding spatial transforms for one or more of the files;
accessing, by the converter from a source repository, the files of the supplied list and at least one model contained in each of those files, wherein each model is associated with a respective spatial coordinate system that defines an arrangement of elements for that model;
treating the models contained in the files of the supplied list as a model graph rooted in the designated root model and related by the corresponding spatial transforms of the supplied list to the designated root model;
mapping each of the models of the model graph into a single project coordinate system by applying the corresponding spatial transforms to one or more of the models;
storing the models of the model graph to an output repository according to the second storage format; and
accessing and displaying a graphical view of at least one of the models of the model graph in the output repository by a CAD application executing on the electronic device or another electronic device.

17. The method of claim 16, wherein the CAD description represents a map composed of separate tiles and each file corresponds to one of the separate tiles.

18. The method of claim 16, wherein the mapping preserves each of the models contained in the files as corresponding models of the second storage format.

19. The method of claim 16, wherein the mapping condenses two or the models contained in the files into a lesser number models of the second storage format by changing ownership of elements.

20. The method of claim 16, wherein the first storage format is a file-based storage format and the second storage format is a relational database-based storage format.

21. The method of claim 20, wherein the file-based storage format is a DgnV8 format and the relational database-based storage format is a DgnDb format.

22. A method for converting a computer aided design (CAD) description maintained in a first storage format to a second storage format, the method comprising:
   accessing the CAD description from a source repository;
   examining, by a converter executing on an electronic device, paths through a model graph of the CAD description that define a graphical view, the paths including a root model related by attachments to one or more attached models, the attachments referencing attached levels, each attached level indicating a display status and symbology that overrides a display status and symbology of a referenced level;
   for each referenced level, generating, by the converter, a category and a default subcategory of the second storage format corresponding to the respective level, the default subcategory indicating the display status and symbology as defined by the respective level;
   for each referenced attached level, generating, by the converter, a subcategory referenced by the category corresponding to the level, the subcategory indicating the display status and symbology that overrides the display status and symbology of the default subcategory as defined by the respective attached level;
   storing each generated category, default subcategory, and subcategory in an output repository; and
   accessing and displaying a graphical view based on one or more generated categories, default subcategories, or subcategories by a CAD application executing on the electronic device or another electronic device.

23. The method of claim 22, wherein the model graph is an acyclic model graph generated from an initial model graph by receiving an indication of a designated root model from the plurality of root models, and beginning from the designated root model, searching attachment paths in the initial model graph and mapping each model encountered into a model of the acyclic model graph.

24. The method of claim 22, wherein one or more models of the model graph reference elements, and the method further comprises:
   for each referenced element, generating by the converter, a corresponding element that references a category generated from the element's level and an element geometry that references a subcategory generated from the element's level; and
   storing each corresponding element in the output repository.

25. The method of claim 22, wherein the generating the category maintains a human readable name of the respective level.

26. The method of claim 22, wherein the first storage format is a file-based storage format and the second storage format is a relational database-based storage format.

27. The method of claim 22, wherein the file-based storage format is a DgnV8 format and the relational database-based storage format is a DgnDb format.

28. A non-transitory electronic device-readable medium containing executable instructions to convert a computer aided design (CAD) description maintained in a first storage format to a second storage format, the executable instructions, when executed by one or more processors of one or more electronic devices operable to:
   examine paths through a model graph of the CAD description that define a graphical view according to the first storage format, the paths including a root model related by attachments to one or more attached models, the attachments referencing attached levels, each attached level indicating a display status and symbology that overrides a display status and symbology of a referenced level;
   for each referenced level, generate a category that maintains a human readable name of the respective level and a default subcategory corresponding to the respective level;
   for each referenced attached level, generate a subcategory referenced by the category corresponding to the level, the subcategory overriding at least one aspect of the default subcategory;
   store each generated category, default subcategory, and subcategory according to the second storage format;
   access and display a graphical view based on one or more generated categories, default subcategories, or subcategories.

29. The transitory electronic device-readable medium of claim 28, wherein the model graph is an acyclic model graph generated from an initial model graph by receiving an indication of a designated root model from the plurality of root models, and beginning from the designated root model, searching attachment paths in the initial model graph and mapping each model encountered into a model of the acyclic model graph.

30. The non-transitory electronic device-readable medium of claim 28, wherein one or more models of the model graph reference elements and the executable instructions, when executed by the one or more processors of the one or more electronic devices, are further operable to:
   for each referenced element, generate a corresponding element that references a category generated from the element's level and an element geometry that references a subcategory generated from the element's level according to the second storage format.

31. The non-transitory electronic device-readable medium of claim 28, wherein the default subcategory maintains the display status and symbology defined by the respective level, and the at least one aspect of the default subcategory that is overridden includes the display status and symbology of the default subcategory.

32. The non-transitory electronic device-readable medium of claim 28, wherein the first storage format is a file-based storage format and the second storage format is a relational database-based storage format.

33. The non-transitory electronic device-readable medium of claim 32, wherein the file-based storage format is a DgnV8 format and the relational database-based storage format is a DgnDb format.

* * * * *